US012571332B2

(12) United States Patent
Sedillos et al.

(10) Patent No.: US 12,571,332 B2
(45) Date of Patent: Mar. 10, 2026

(54) MOBILE OIL STREAM ENERGY RECOVERY SYSTEM

(71) Applicant: Transitional Energy LLC, Aurora, CO (US)

(72) Inventors: Lia Sedillos, Denver, CO (US); Johanna Ostrum, Broomfield, CO (US); Benjamin C. Burke, Littleton, CO (US); Marcus Knox, Castle Rock, CO (US); Russell C. Roundtree, Golden, CO (US); Salina Derichsweiler, Aurora, CO (US)

(73) Assignee: Gradient Geothermal, Inc., Aurora, CO (US)

( * ) Notice: Subject to any disclaimer, the term of this patent is extended or adjusted under 35 U.S.C. 154(b) by 0 days.

(21) Appl. No.: 18/846,179

(22) PCT Filed: Mar. 13, 2023

(86) PCT No.: PCT/US2023/015086
§ 371 (c)(1),
(2) Date: Sep. 11, 2024

(87) PCT Pub. No.: WO2023/172770
PCT Pub. Date: Sep. 14, 2023

(65) Prior Publication Data
US 2025/0382900 A1     Dec. 18, 2025

Related U.S. Application Data

(60) Provisional application No. 63/319,083, filed on Mar. 11, 2022.

(51) Int. Cl.
*F01K 11/00*     (2006.01)
*F01K 13/00*     (2006.01)
(Continued)

(52) U.S. Cl.
CPC .............. *F01K 11/00* (2013.01); *F01K 13/00* (2013.01); *F01K 25/08* (2013.01); *F03G 4/035* (2021.08)

(58) Field of Classification Search
None
See application file for complete search history.

(56) References Cited

U.S. PATENT DOCUMENTS 6,981,377 B2 *  1/2006  Vaynberg ................ F01K 25/08
                                                          60/641.11
10,775,080 B2 *  9/2020  Frantz ....................... F17C 5/06
                     (Continued)

FOREIGN PATENT DOCUMENTS

CN       104004559 A   *   8/2014
CN       210974566 U   *   7/2020
                     (Continued)

OTHER PUBLICATIONS

International PCT Patent Application PCT/US2023/015086, Filed Mar. 13, 2023, "International Search Report and Written Opinion" dated Jan. 3, 2024.

*Primary Examiner* — Laert Dounis
(74) *Attorney, Agent, or Firm* — NOD Law PC

(57) ABSTRACT

A mobile heat exchanger may include an Organic Rankine Cycle assembly configured to generate the power. A mobile heat exchanger may include a mobile heat exchanger skid in fluid communication with the Organic Rankine Cycle assembly and configured to transfer thermal energy from a high-temperature fluid to a working fluid. The mobile heat exchanger may include a frame having a plurality of extending supports, none of which are arranged in a cleaning volume. The mobile heat exchanger may include a low-pressure heat exchanger arranged adjacent to the cleaning volume facilitating in situ plate cleaning of the low-pressure heat exchanger. The mobile heat exchanger may include at (Continued)

least a first pipe loop and a second pipe loop, both selectively coupled to the low-pressure heat exchanger. The mobile heat exchanger may be arranged on a transportable skid.

19 Claims, 19 Drawing Sheets

(51) Int. Cl.
    *F01K 25/08*         (2006.01)
    *F03G 4/00*          (2006.01)

(56)          References Cited

U.S. PATENT DOCUMENTS

| | | |
|---|---|---|
| 11,187,212 B1 | 11/2021 | Bodishbaugh et al. |
| 11,236,735 B1 | 2/2022 | Bodishbaugh et al. |
| 11,255,315 B1 | 2/2022 | Bodishbaugh et al. |
| 11,486,370 B2 * | 11/2022 | Bodishbaugh .......... F03G 7/045 |
| 11,927,177 B2 | 3/2024 | Marsh et al. |
| 11,971,019 B2 | 4/2024 | Bodishbaugh et al. |
| 2011/0126539 A1 | 6/2011 | Ramaswamy |
| 2014/0174122 A1 * | 6/2014 | Cooper ................... C10L 3/101 |
| | | 62/618 |
| 2015/0076831 A1 | 3/2015 | Giegel |
| 2015/0361831 A1 * | 12/2015 | Myers ..................... F01K 23/06 |
| | | 60/645 |
| 2018/0073777 A1 | 3/2018 | O'Donnell et al. |

FOREIGN PATENT DOCUMENTS

| | | | | |
|---|---|---|---|---|
| CN | 216081139 U | * | 3/2022 | |
| WO | 2013067570 A1 | | 5/2013 | |
| WO | 2014148924 A1 | | 9/2014 | |
| WO | 2018206773 A1 | | 11/2018 | |
| WO | WO-2022213130 A1 | * | 10/2022 | ............. F22B 37/38 |

* cited by examiner

MOBILE OIL STREAM ENERGY RECOVERY SYSTEM

CROSS REFERENCE TO RELATED APPLICATION

The present application is the United States National Phase of International Patent Application No. PCT/US2023/015086, entitled "MOBILE OIL STREAM ENERGY RECOVERY SYSTEM" filed Mar. 13, 2023, which claims priority to U.S. Provisional Application No. 63/319,083, entitled "HEAT EXCHANGER SKID" filed Mar. 11, 2022, and assigned to the assignee hereof and hereby expressly incorporated by reference herein.

FIELD OF THE DISCLOSURE

The present disclosure relates generally to geothermal energy conversion. In particular, but not by way of limitation, the present disclosure relates to systems, methods and apparatuses for conveying thermal energy from a flowline to a binary cycle geothermal heat engine to generate electricity and provide fluid cooling to the flowline fluids.

DESCRIPTION OF RELATED ART

Water vapor and other high-energy gases have long been used to spin turbines and generate electricity. This, this technology more recently has been used to provide electrical energy to oilfield equipment that is often far from typical electrical sources and may be forced to rely heavily on solar and other expensive power sources. However, concentrations of salts and total dissolved solids in hydrocarbon producing fluid sources such as wellheads along with high pressures, can create troublesome deposits inside the equipment when they change temperature or pressure, making it difficult to flash water, a necessary step in using these sources for remote energy production. Organic Rankine Cycle (ORC) engines or generators have been implemented that instead typically change phase of a non-aqueous solution with a lower boiling point to drive a turbine or expander. ORC engines are used where fluid temperatures are not high enough to flash to steam a water-based generator.

Existing ORC assemblies have a heat exchanger on an input loop that transfers sufficient thermal energy from the oilfield stream to a working fluid to vaporize the working fluid, which the flows to a gas expander, causing the gas expander to rotate and generate electricity in a generator. The vaporous working fluid is then returned to a liquid form via a condenser or heat sink before returning to the heat exchanger for further heat extraction.

Oilfield streams typically contain chlorides, scales, sand, and emulsions that can quickly gum up and clog internal components of a heat exchanger such as plates, gaskets, tubes, and baffles. For instance, oilfield streams can cause chloride, asphaltene, or paraffin scale buildup (e.g., Calcium Chloride, Barium Sulfate, Strontium Sulfate, Silica Dioxide, Magnesium Sulfate) within a heat exchanger and/or sand and emulsions can gum up heat exchanger components. These internal components are also difficult to clean, and may not be accessible within an ORC system, thus using an ORC system with oilfield streams is either not feasible or can take an ORC system operate at significantly lower efficiency or can be offline for significant periods of costly time thereby either shutting down a whole production stream or robbing the facility of energy or cooling (where an ORC is also used to cool oilfield streams). Therefore, despite the potential of ORC engines to provide a means of remote energy generation based on excess thermal energy in hydrocarbon production streams, these systems have not been widely implemented in successful commercial applications.

Some disclosures have considered using a second heat exchanger between the hydrocarbon production stream and the heat exchanger of the ORC, as disclosed in, for instance, U.S. Pat. Nos. 11,187,212, 11,236,735, 11,293,414, 11,255, 315, 11,578,706, and 11,421,663, assigned to ICE THERMAL HARVESTING. However, none of these approaches address the fundamental challenge of heat exchanger fouling under the challenging circumstance of extracting thermal energy from 'dirty' oilfield streams. Like other known heat extraction systems, inaccessibility of the heat exchanger within a system makes it difficult to clean internal components of the heat exchanger, and downtime for the production stream is prohibitively costly. Additionally, these systems favor high pressure operation and the use of working fluids optimized for heat transfer—i.e., having a high specific heat. Accordingly, liquified $CO_2$ and similar high-pressure working fluids are utilized and pressures in excess of 1,000 or even 10,000 psi are used, which may present safety hazards on oil and gas production sites. Additionally, these systems are not mobile, thus increasing the cost and time associated with deployment.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

There is thus a need for lower pressure and thus safer and less costly energy recovery systems that are both mobile and use easy-to-clean heat exchangers. The disclosed solutions reduce downtime for heat exchanger cleaning thereby minimizing interruptions to production, enable a package that is easily moved between sites and again can be installed and removed with little downtime to production, and meet the industry demand for atmospheric operation (i.e., safer operation).

Embodiments disclosed herein address the above stated needs by disclosing a modular heat exchanger unit that acts as a buffer or isolator between a high-temperature oilfield stream (e.g., produced water) and difficult-to-clean ORC systems. The modular heat exchanger unit also acts as a pressure buffer between the oilfield stream, sometimes seeing greater than 1000 psi, and the ORC system, typically handling not much more than 100 psi. More specifically, this disclosure describes a safe, low-pressure modular heat exchanger unit (e.g., a skid) delivering thermal energy to a geothermal heat engine (e.g., ORC) for thermal energy conversion. The modular heat exchanger unit (or mobile heat exchanger skid) can include two pipe loops secured to and arranged atop a rectangular cuboid-shaped frame. The skid can include a heat exchanger at one end (a proximal end) and electronics at an opposing or distal end. The distal end may also include open flange pipe connections to connect to an external geothermal heat engine (e.g., an Organic Rankine Cycle assembly or generator). The first pipe loop can pass a high-temperature oilfield stream (e.g., production fluids like oil and gas or drilling fluids to name a few non-limiting examples) while the second pipe loop, or intermediate loop, can circulate a working fluid comprising an aqueous solution of water or a water and glycol mix existing in a liquid state under roughly atmospheric pressure (i.e., a low-pressure working fluid) and temperatures up to 350° F. Although aqueous solutions do not exhibit the same thermal capacity/specific heat as some working fluids in the art, such as liquified $CO_2$, the ability to operate near atmospheric pressure greatly improves safety and reduces cost and ease of deployment as well as mobility of the skid, and these advantages unexpectedly outweigh the degraded thermal transport of aqueous working fluids in the field of oilfield energy recovery. Along with a skeletonized frame configured to allow easy cleaning of a heat exchanger in the modular heat exchanger unit without moving or removing skid components (e.g., frame struts), low pressure operation allows faster and less expensive deployment and movement of the skid than is possible with the high-pressure systems in the art. Additionally, the low-pressure heat exchanger, or any portion of the first pipe loop, can be arranged at least 15 feet from primary electronics (e.g., controller and pump electronics) to avoid the need for Class 1 Division 2 electronics specifications.

In some embodiments, the present disclosure generally relates to systems, methods, and apparatus for generating power using a mobile heat exchanger skid couplable to an Organic Rankine Cycle (ORC) assembly, and yet mobile enough to be easily decoupled therefrom and moved to a different site and quickly coupled to a different ORC assembly. The skid can be located near a wellhead during hydrocarbon production and thereby take production fluids (e.g., oil and gas), drilling fluids, or fracking fluids as inputs and sources of thermal energy to be transferred to a given ORC assembly. The input fluid can be referred to as a high-temperature input fluid, high-temperature fluid, or high-temperature oilfield stream. Such a high-temperature fluid can be sourced from a wellhead, pumping station, and other in-field components or equipment, such as fracturing equipment, pumpjacks, drilling rigs, compressors, etc. as well as nodes within a fluid gathering system or any internal combustion engine produced excess waste heat, etc. The fluid gathering system may also be known as a central gathering facility, a central processing facility, a central tank farm, or known by the initialisms of the previous facilities.

Unlike existing high-pressure systems, the first and second pipe loops as well as the heat exchanger can be "low-pressure," meaning that the first pipe loops operates below 600 psi and the second pipe loop operates below 150 psi.

The heat exchanger, first and second pipe loops, a pump, and expansion tank can be coupled to the frame and fit within a volume roughly the same size as a typical shipping container making this modular system easy to transport between production facilities and simple to couple between a high-temperature fluid source and an ORC assembly.

In some aspects, the techniques described herein relate to a system for generating power, including: an Organic Rankine Cycle assembly configured to generate the power; a mobile heat exchanger skid in fluid communication with the Organic Rankine Cycle assembly and configured to transfer thermal energy from a high-temperature fluid to a working fluid, the mobile heat exchanger skid including: a frame having a plurality of extending supports, none of which are arranged in a plate-cleaning volume; a low-pressure heat exchanger arranged adjacent to the plate-cleaning volume facilitating in situ plate cleaning of the low-pressure heat exchanger; at least a first pipe loop and a second pipe loop, both selectively coupled to the low-pressure heat exchanger; a pump in the second pipe loop; the first pipe loop passes through the low-pressure heat exchanger and is configured to pass the high-temperature fluid through the low-pressure heat exchanger; and the second pipe loop passes through the low-pressure heat exchanger in proximity to the first pipe loop and is configured to (1) bring the working fluid into the low-pressure heat exchanger at a first temperature, (2) remove the working fluid from the low-pressure heat exchanger at a second temperature greater than the first temperature, and (3) provide the working fluid to the Organic Rankine Cycle assembly.

In some aspects, the techniques described herein relate to a system, wherein the working fluid is an aqueous solution including water.

In some aspects, the techniques described herein relate to a system, wherein the working fluid an aqueous solution including water and glycol.

In some aspects, the techniques described herein relate to a system, wherein the working fluid is primarily in a liquid form throughout the second pipe loop.

In some aspects, the techniques described herein relate to a system, wherein the second pipe loop is maintained below 150 psi.

In some aspects, the techniques described herein relate to a system, wherein the high-temperature fluid is below a degradation threshold of a polymer used to fabricate at least one section of the first pipe loop.

In some aspects, the techniques described herein relate to a system, wherein the frame is a substantially flat and rectangular skid.

In some aspects, the techniques described herein relate to a system, wherein the plate-cleaning volume at least coincides with a height of plates within the low-pressure heat exchanger.

In some aspects, the techniques described herein relate to a system, wherein the plate-cleaning volume has dimensions at least as great as one or more heat exchanger plates.

In some aspects, the techniques described herein relate to a system, wherein the plate-cleaning volume extends substantially to coupling interfaces of the first pipe loop and the second pipe loop.

In some aspects, the techniques described herein relate to a system, wherein the high-temperature fluid enters the low-pressure heat exchanger at between 100° F. to 350° F.

In some aspects, the techniques described herein relate to a mobile heat exchanger assembly including: a frame having a low-pressure heat exchanger coupled to and extending from a top of the frame; a first pipe loop configured to provide a high-temperature oilfield stream to the low-pressure heat exchanger, the first pipe loop including: a first pipe segment coupled to the low-pressure heat exchanger; a second pipe segment coupled to the low-pressure heat exchanger; a passage in the low-pressure heat exchanger coupling the first and second pipe segments; and a second pipe loop configured to provide a low-pressure working fluid to the low-pressure heat exchanger to transfer thermal energy from the high-temperature oilfield stream to the low-pressure working fluid and further configured to provide the low-pressure working fluid to an Organic Rankine Cycle assembly for generating power, the second pipe loop including: a pump; a third pipe segment coupled to the low-pressure heat exchanger; a fourth pipe segment coupled to the low-pressure heat exchanger; and a second passage in the low-pressure heat exchanger coupling the third and fourth pipe segments.

In some aspects, the techniques described herein relate to a mobile heat exchanger assembly, wherein the first pipe segment includes a first removable pipe section and the third pipe segment includes a second removable pipe section, wherein when the first and second removable pipe sections are removed, a cleaning volume is left adjacent to the low-pressure heat exchanger.

In some aspects, the techniques described herein relate to a mobile heat exchanger assembly, wherein the first and second removable pipe sections are arranged on a same side of the low-pressure heat exchanger.

In some aspects, the techniques described herein relate to a mobile heat exchanger assembly, wherein the low-pressure working fluid is an aqueous solution including water and wherein the low-pressure working fluid is maintained below 150 psi.

In some aspects, the techniques described herein relate to a mobile heat exchanger assembly, wherein the low-pressure working fluid is between 30° F. and 350° F.

In some aspects, the techniques described herein relate to a mobile heat exchanger assembly, wherein the low-pressure working fluid is an aqueous solution including water and glycol and wherein the low-pressure working fluid is maintained below 150 psi.

In some aspects, the techniques described herein relate to a mobile heat exchanger assembly, further including: two or more temperature and/or pressure sensors on the first and/or second pipe loops; and a controller receiving data from the two or more sensors and configured to adjust a flow in at least one of the first and second pipe loop to optimize for at least one of power generation and cooling of the high-temperature oilfield stream.

In some aspects, the techniques described herein relate to a mobile heat exchanger assembly, wherein the controller is configured to adjust at least one of the pump and a valve in the second pipe loop to optimize thermal transfer between the first and second pipe loops.

In some aspects, the techniques described herein relate to a mobile heat exchanger assembly, further including at least a distance D1 between any portion of the first pipe loop and the controller, where the distance D1 is 15 feet.

In some aspects, the techniques described herein relate to a method of operating a mobile heat exchanger skid including: locating the mobile heat exchanger skid near a hydrocarbon production facility; making a first fluid connection between the hydrocarbon production facility and a first input of a heat exchanger of the mobile heat exchanger skid; making a second fluid connection between a second input of the heat exchanger and an output of an Organic Rankine Cycle generator; making a third fluid connection between a first output of the heat exchanger and an input of the Organic Rankine Cycle generator; circulating a working fluid between the heat exchanger and the Organic Rankine Cycle generator at less than 150 psi until a cleaning trigger occurs; decoupling the heat exchanger from the third fluid connection; extracting at least one internal component of the heat exchanger to a cleaning volume adjacent to the heat exchanger without decoupling the heat exchanger from the mobile heat exchanger skid; and cleaning the at least one internal component within the cleaning volume.

In some aspects, the techniques described herein relate to a method, wherein the working fluid is an aqueous solution including water.

In some aspects, the techniques described herein relate to a method, wherein the working fluid is an aqueous solution including water and glycol.

In some aspects, the techniques described herein relate to a method, wherein the working fluid is maintained below 150 psi.

In some aspects, the techniques described herein relate to a method, further including, decoupling the first, second, and third fluid connections, moving the mobile heat exchanger skid to a location near a second hydrocarbon production facility and making a new set of first, second, and third fluid connections with the second hydrocarbon production facility and a second Organic Rankine Cycle generator.

In some aspects, the techniques described herein relate to a method, wherein the cleaning trigger is a drop of at least 15% in at least one of pressure, flow, and heat recovery.

In some aspects, the techniques described herein relate to a method, wherein the cleaning trigger is a drop of at least 20% in at least one of pressure, flow, and heat recovery.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1:
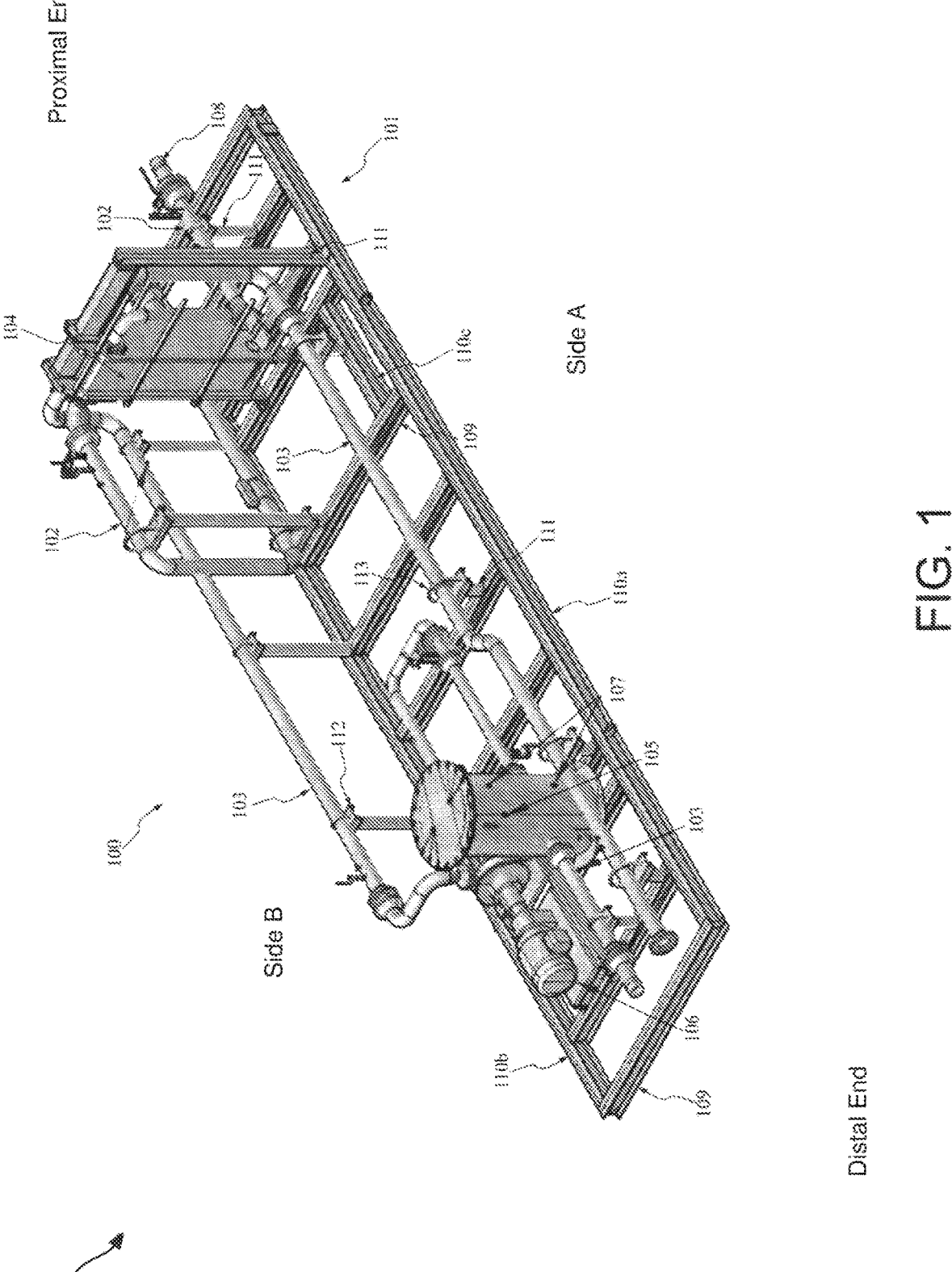
FIG. 1 is a perspective view of an embodiment of the present disclosure, highlighting the structural elements of the embodiment.

The present disclosure relates generally to geothermal energy conversion. In particular but not by way of limitation, the present disclosure relates to systems, methods and apparatuses for conveying thermal energy from a flowline to a geothermal heat engine to generate electricity.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present disclosure. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Additionally, the flowcharts and block diagrams in the following Figures illustrate the functionality and operation of possible implementations of a according to various embodiments of the present disclosure. It should be noted that, in some alternative implementations, the functions noted in each block may occur out of the order noted in the figures. For example, two blocks shown in succession may, in fact, be executed substantially concurrently, or the blocks may sometimes be executed in the reverse order, depending upon the functionality involved.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

For the purposes of this disclosure, a "pump" can include various pump types including but not limited to, IBNLT centrifugal, axial flow, radial flow, mixed flow, positive displacement pump, reciprocating pump, rotary pump, and permanent magnet motor pump.

Figure 8:
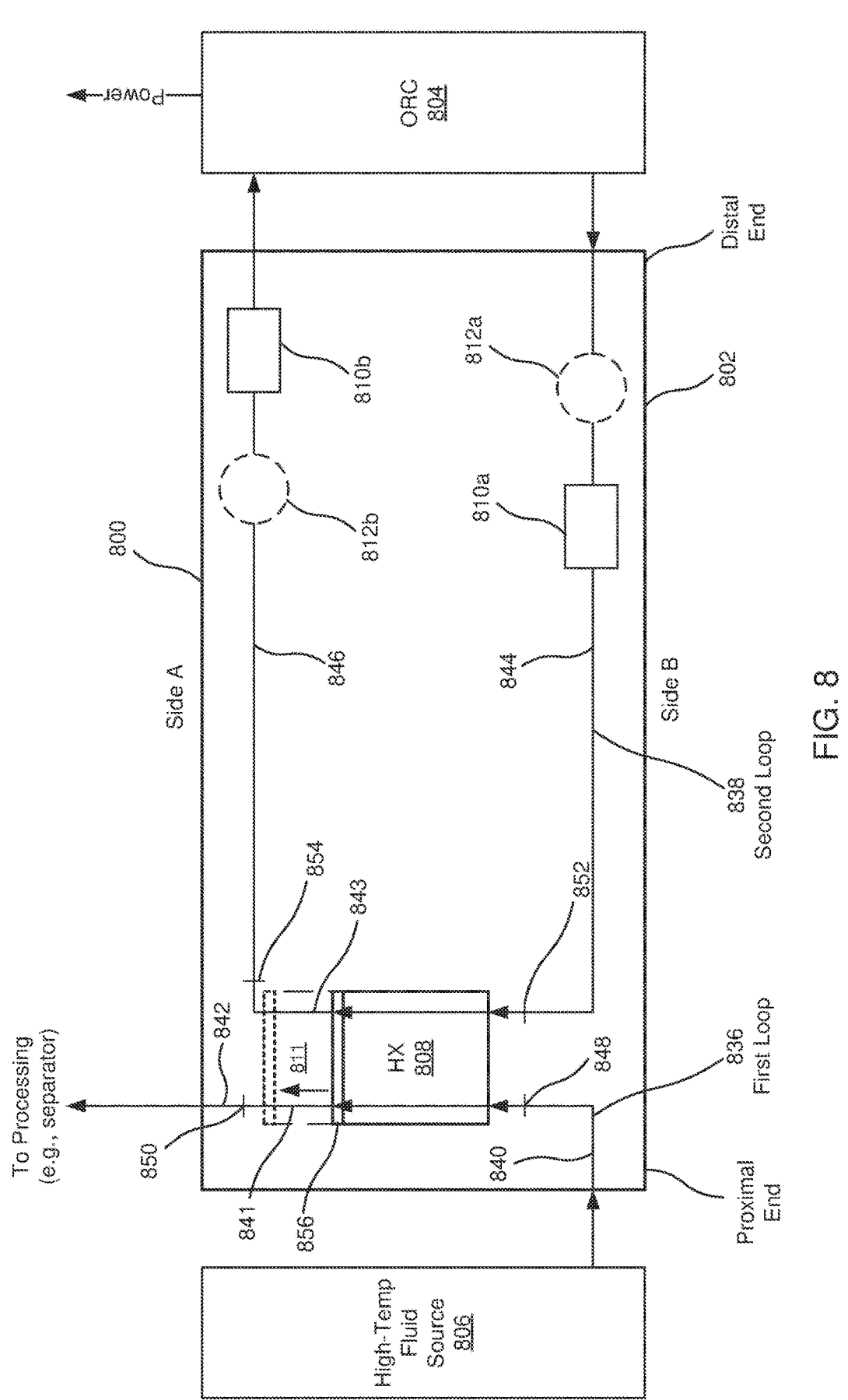
FIG. 8 illustrates an embodiment of a system for generating power including a high-temperature fluid source, a mobile heat exchanger skid, and an ORC assembly.

FIG. 8 illustrates an embodiment of a system for generating power including a high-temperature fluid source, a mobile heat exchanger skid, and an Organic Rankine Cycle (ORC) assembly. The mobile heat exchanger skid 800 can include a rectangular frame, possibly being substantially flat as better seen in FIGS. 12-14. This frame can be made of steel or other high-strength and high-rigidity materials and can include a plurality of extending supports (extending upward from the frame), some examples of which are pointed out as 1302 in FIG. 13. The skid 800 can be in fluid communication with a high-temperature fluid source 806, such as a wellhead or pump station associated with drilling, fracking, or extraction/production, to name a few non-limiting examples. The skid 800 can also be in fluid communication with an ORC assembly 804 that is configured to generate electricity that may be provided to a battery, the grid, or in-field operational equipment (including the skid 800 itself). The skid 800 can include a first pipe loop 836 and a second pipe loop 838 in thermal communication via the heat exchanger 808 and each selectively coupled to the heat exchanger 808. The skid 800 can generally be configured to transfer thermal energy from the high-temperature fluid (sourced from source 806) in the first pipe loop 836 to a working fluid in the second pipe loop 838. The high-temperature fluid typically enters the heat exchanger 808 at around 100° and 350° F. The working fluid can be an aqueous solution such as water, a water and glycol mix, ammonia, or any other working fluid that is a liquid at around atmospheric pressure with a specific heat capacity greater than 4.186 Joules per gram per degree Celsius. The working fluid is typically maintained below 150 psi to reduce risks and allows less expensive materials to be used as well as less onerous and slow procedures (e.g., decoupling the skid or heat exchanger 808 does not require a lengthy depressurization process). In some embodiments, this can include maintaining or circulating the working fluid at substantially atmospheric pressure (e.g., 14.7 psi at sea level). Lower pressures also mean that the heat exchanger 808 can be a low-pressure heat exchanger (a low-pressure heat exchanger operating at around atmospheric pressure) that is less expensive to procure, operate, and upkeep. Additionally, operating at low-pressure or near atmospheric, means that the skid 800 can be disconnected from the high-temperature fluid source 806 as well as the ORC assembly 804 without a decompression process, to allow more mobile use cases. Coupling to the ORC assembly 804 can be via flexible hoses allowing the ORC assembly 804 to be set at an angle relative to the skid 800. For instance, if the ORC assembly 804 is considered to be aligned with a longitudinal axis of the skid 800 in FIG. 8, the flexible connections can allow the ORC assembly 804 to be arranged at 10°, 45°, and even 90°, to name a few non-limiting examples, from the longitudinal axis of the skid 800, allowing more flexible placements on the wellsite.

Regarding temperature, the heat exchanger 808 operates below a flash point of the working fluid. For instance, the high-temperature oilfield stream can be up to a degradation threshold of a polymer or gasket material used to fabricate at least one section of the first pipe loop 836 or component of the heat exchanger 804. For instance, where polyethylene is used in the first pipe loop 836, the high-temperature oilfield stream may be maintained between 150° F. and 266° F., and where polycarbonate is used, the range may be 150° F. to 284° F. At the ORC assembly 804, the working fluid may be at or above 175° F., at or above 180° F., and at or above 200° F. Where higher energy transfer is prioritized over the type of piping used, the working fluid may reach as high as 500° F.

The second pipe loop 838, via flow or circulation of the working fluid, can transfer thermal energy from the heat exchanger 808 to the ORC assembly 804. This flow can be controlled at least in part by a state of setting of a pump 810a or 810b such as a pump (e.g., a water pump or pump capable of operating with various aqueous solutions). The pump can be located on an upstream or downstream side of the heat exchanger 808, as shown by the alternate placements, 810a and 810b, one of which is selected for a given system. The second pipe loop 838 may also include an optional expansion tank 812a or 812b, again arranged on either the upstream or downstream side of the heat exchanger 808. The pump and expansion tank need not both be arranged upstream or downstream of the heat exchanger 808.

The first pipe loop 836 can pass through the heat exchanger 808 and couples the high-temperature fluid source 806 to downstream processing, such as, but not limited to, a separator or storage tank (e.g., drilling fluid storage tank). The first pipe loop 836 carries the high-temperature fluid and is configured to pass this fluid through the heat exchanger 808 in proximity to the second pipe loop 838, which carries the working fluid between the heat exchanger 808 and the ORC assembly 804. The second pipe loop 838 also passes through the heat exchanger 808 and is configured to bring the working fluid into the heat exchanger at a first temperature and remove the working fluid from the heat exchanger 808 at a second temperature greater than the first temperature. The working fluid at the second temperature is then provided to the ORC assembly 804.

The first pipe loop 836 can include a first pipe segment 840 coupled between the high-temperature fluid source 806 and a first input of the heat exchanger 808. In some embodiments, the first pipe segment 840 can be wholly or nearly wholly within a boundary of the skid 800 and include a coupler, interface, or connection to another pipe segment bringing high-temperature fluid form the high-temperature fluid source 806. A second pipe segment 842 can be coupled between a first output of the heat exchanger 808 and a pipe segment carrying the fluid to downstream processing components and may be wholly or nearly wholly within a boundary of the skid 800. Both of these pipe segments 840 and 842 can include a coupling interface 848 and 850, respectively, to facilitate connection and disconnection of the first input to the heat exchanger 808 and the first output of the heat exchanger 808. In particular, a portion of the second pipe segment 842 between the coupling interface 850 and the heat exchanger 808 can be referred to as a first removable pipe section 841 since it is easily removed for heat exchanger 808 cleaning (e.g., plate cleaning). The coupling interfaces allow one or more bolts or other fasteners to be quickly removed to facilitate rapid removal of the first removable pipe section 841 to enable cleaning interior components of the heat exchanger 808. The first and second pipe segments 840 and 842 are coupled to each other via a first passage in the heat exchanger 808. So, in some cases, the first pipe loop 836 can include the first pipe segment 840, the first passage in the heat exchanger 808, and the second pipe segment 842.

The second pipe loop 838 can include a third pipe segment 844 coupled between the ORC assembly 804 and a second input of the heat exchanger 808. In some embodiments, the third pipe segment 844 can be wholly or nearly wholly within a boundary of the skid 800 and include a coupler, interface, or connection to another pipe segment that is part of or connected to the ORC assembly 804. A fourth pipe segment 846 can be coupled between a second output of the heat exchanger 808 and a pipe segment carrying the working fluid to the ORC assembly 804 and may be wholly or nearly wholly within a boundary of the skid 800. Both of these pipe segments 844 and 846 can include a coupling interface 852 and 854, respectively, to facilitate connection and disconnection of the second input to the heat exchanger 808 and the second output of the heat exchanger 808. In particular, a portion of the fourth pipe segment 846 between the coupling interface 854 and the heat exchanger 808 can be referred to as a second removable pipe section 843 since it is easily removed for heat exchanger 808 cleaning (e.g., plate cleaning). The coupling interfaces allow one or more bolts or other fasteners to be quickly removed to facilitate rapid removal of the second removable pipe section 843 to enable cleaning interior components of the heat exchanger 808. The third and fourth pipe segments 844 and 846 are coupled to each other via a second passage in the heat exchanger 808. So, in some cases, the second pipe loop 838 can include the third pipe segment 844, the second passage in the heat exchanger 808, and the fourth pipe segment 846.

The first and second removable pipe sections 841 and 843 can be arranged on a same side of the heat exchanger 808 (e.g., on Side B in the illustrations).

The heat exchanger 808 may include a cover plate 856 that can be removed to facilitate access to internal components of the heat exchanger 808, such as plates and gaskets. In some embodiments, the cover plate 856, which can often be a large thick steel plate weighing hundreds of pounds, can slide laterally on one or more rails. The width and height of this cover plate 856 along with a length of the rails can define a cleaning volume 811 that in some embodiments is kept free of frame struts or immovable (or hard to remove) segments of pipe. In this way, internal components of the heat exchanger 808, such as plates, can be moved into the cleaning volume 811 and either removed for intensive cleaning, or cleaned in situ, without removing or moving the heat exchanger 808 from the skid 800. This cleaning volume 811 thus allows much faster cleaning of the heat exchanger and thus shorter downtime than existing systems. Although illustrated on Side A of the heat exchanger 808, the cover plate 856 and the cleaning volume 811 can also be arranged on Side B of the heat exchanger 808.

Figure 17:
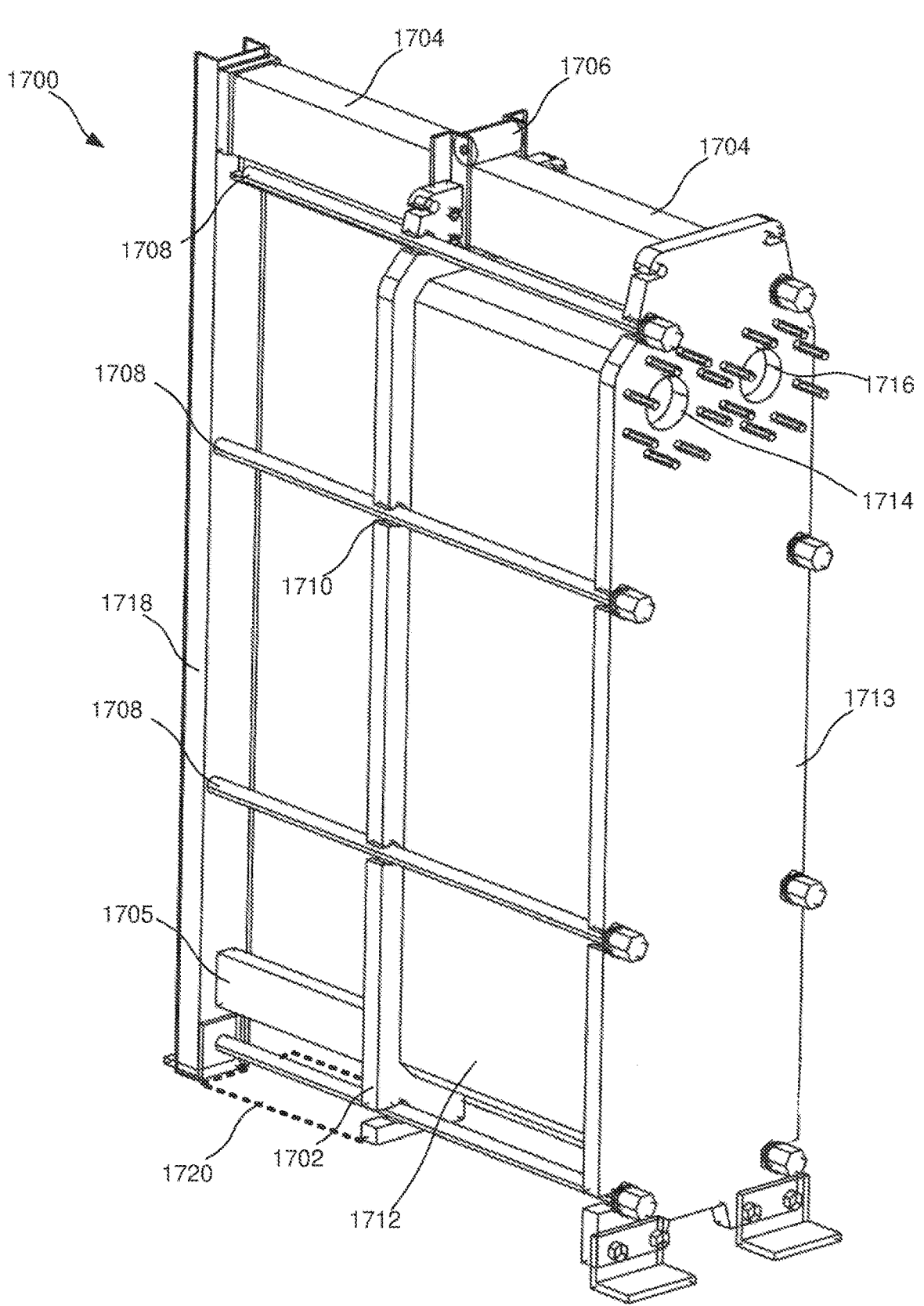
FIG. 17 is an illustrative heat exchanger according to an embodiment of the disclosure.

An illustrative heat exchanger can be seen in FIG. 17, including cover plate 1702, rails 1704 and 1705, a roller 1706 coupled to a top end of the cover plate 1702 and slidingly suspending the cover plate 1702 from the top rail 1704. The heat exchanger 1700 further includes one or more guide rods 1708 that pass through guide notches 1710 in the cover plate 1702 and vertical framing plate 1713 to guide lateral sliding of the cover plate 1702 as well as plates (not visible) within the heat exchanger 1700. A housing 1712 can be arranged over the plates and between the cover plate 1702 and the vertical framing plate 1713 to protect the plates from impact and contamination. The housing 1712 can be substantially the same or slightly larger in size than the plates within the housing 1712. In this view, two ports 1714 and 1716 can be seen, each one belonging to one of the first or second pipe loops. For instance, in most of the illustrations in this disclosure, the first port 1714 corresponds to the second input to the heat exchanger discussed relative to FIG. 8 and the second port 1716 corresponds to the first input to the heat exchanger.

Figure 18:
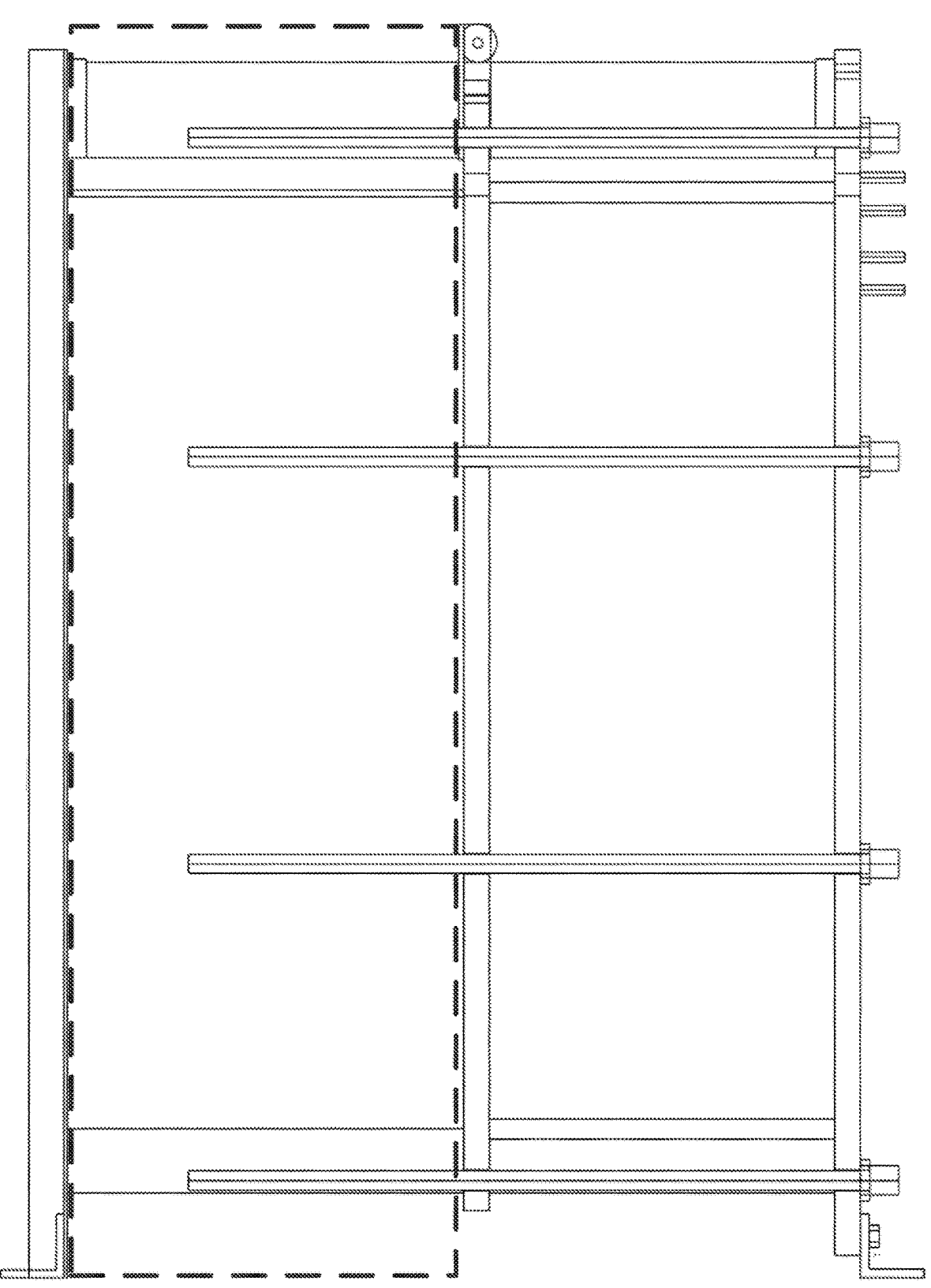
FIG. 18 shows a front elevation view of the heat exchanger of FIG. 17.
Figure 19A:
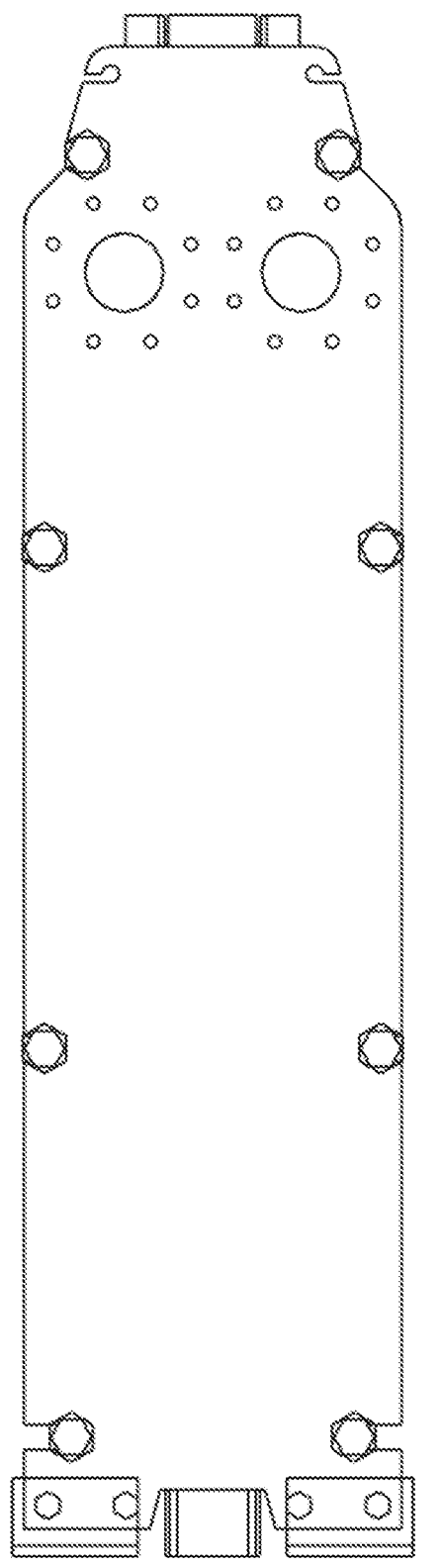
FIG. 19A shows a first side elevation view of the heat exchanger of FIG. 17.
Figure 19B:
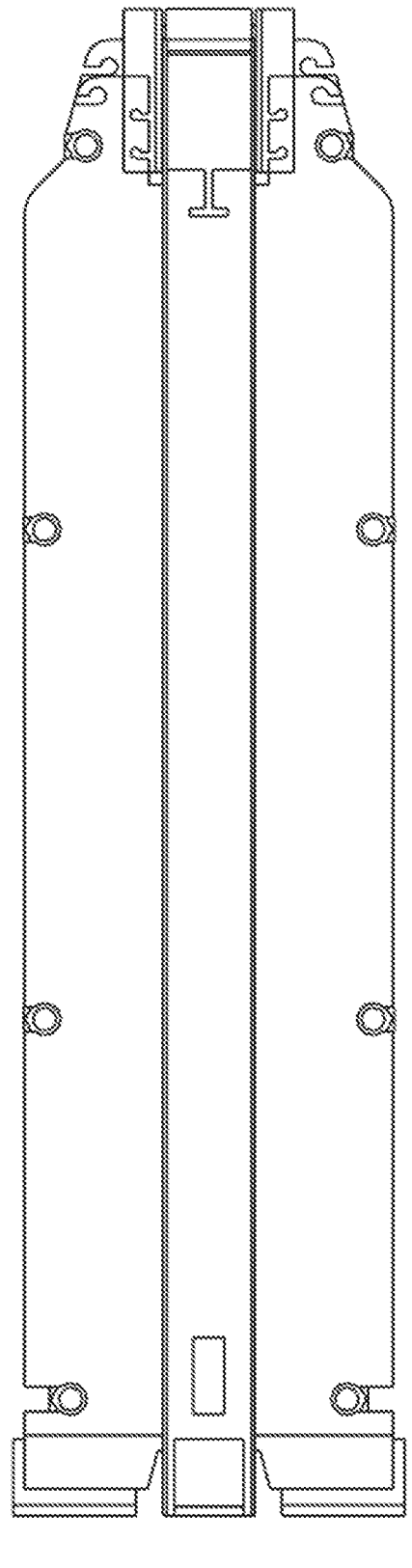
FIG. 19B shows a second side elevation view of the heat exchanger of FIG. 17.

In this embodiment, a heat exchanger strut 1718 can be coupled to the frame and extend upward from the frame and intersect with and support an upper rail 1704. As seen, the cover plate 1702 can slide laterally along the rails 1704 and 1705 until approximately the heat exchanger strut 1718 and thus this strut 1718 may define one plane bounding the cleaning volume. Although the cleaning volume is not shown, one illustrative base boundary 1720 of the cleaning volume is shown in dashed lines, where this rectangle could be drawn upward to the top rail 1704 to define an illustrative cleaning volume. In other words, the cleaning volume could be defined as the volume stretching upward from the base boundary 1720. A front elevation view of a boundary of the cleaning volume can be seen in FIG. 18. As seen, the boundary of the cleaning volume can at least coincide with or be larger than a height of plates within the heat exchanger. Where plates can be cleaned within this cleaning volume it may be referred to as a plate-cleaning volume. Generally, the skid is designed such that components of the frame, such as frame struts, as well as immovable or difficult to move pipe segments, are not arranged within the cleaning volume. As seen in FIG. 8, one or two removable pipe sections (e.g., 841 and 843) may be arranged within the cleaning volume, but these are easily decoupled and removed for cleaning and any supports for these pipe segments are kept outside of the cleaning volume.

FIG. 17 shows one example of a plate-and-frame heat exchanger, though many other shapes, forms, and types of plate-and-frame heat exchanger may also be implemented. In other embodiments, other heat exchanger types may also be implemented wherever a heat exchanger is described in this disclosure, for instance, but not limited to, a shell-and-tube heat exchanger. Plate-and-frame heat exchangers tend to be used where thermal efficiency is a priority, but also involve higher pressure and lower flow rates, and thus shell-and-tube are often used where higher temperatures and higher flow rates are encountered.

Different embodiments of the cleaning volume and the removable pipe sections are illustrated throughout FIGS. 10-14.

Figure 10:
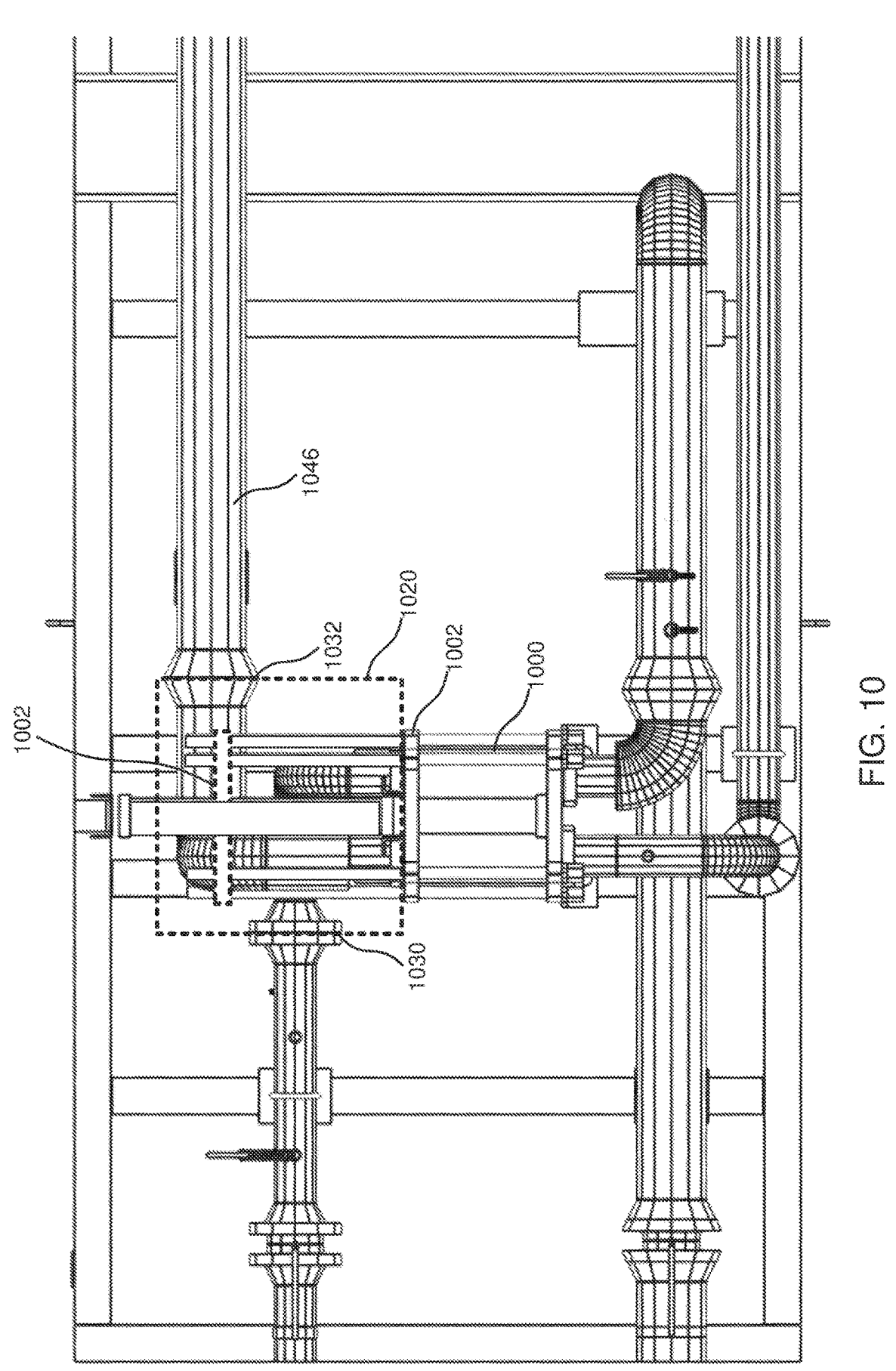
FIG. 10 shows a cleaning volume 1020 as viewed from above.

FIG. 10 shows a cleaning volume as viewed from above. The heat exchanger 1000 includes a cover plate 1002 in two different positions, one for operation (solid lines) and one for cleaning (dashed lines). The cleaning volume 1020 can be defined by these two positions of the cover plate 1002, though in this embodiment, the cover plate 1002 in an operational position defines a first boundary of the cleaning volume 1020, while an opposing boundary of the cleaning volume 1020 stretches past the cleaning position of the cover plate 1002 and extends to a heat exchanger strut such as 1718 seen in FIG. 17 and past a third pipe segment 1046. Within this cleaning volume 1020 are two removable pipe sections that couple to the heat exchanger 1000 at a first end and to a coupling interface 1030 and 1032 at opposing ends. These removable pipe sections can be similar to those discussed as 841 and 843 in FIG. 8. The coupling interfaces allow one or more bolts or other fasteners to be quickly removed to facilitate rapid removal of the removable pipe sections for cleaning interior components of the heat exchanger 1000. The cleaning volume 1020 has another dimension (proximal to distal or left to right in the figure) that extends to these coupling interfaces 1030 and 1032. In other embodiments, such as that shown in FIG. 11, the cleaning volume 1020 may be smaller, such as extending just far enough to encompass a width of the cover plate 1002 and extending substantially to an end of the guide rods.

Figure 11:
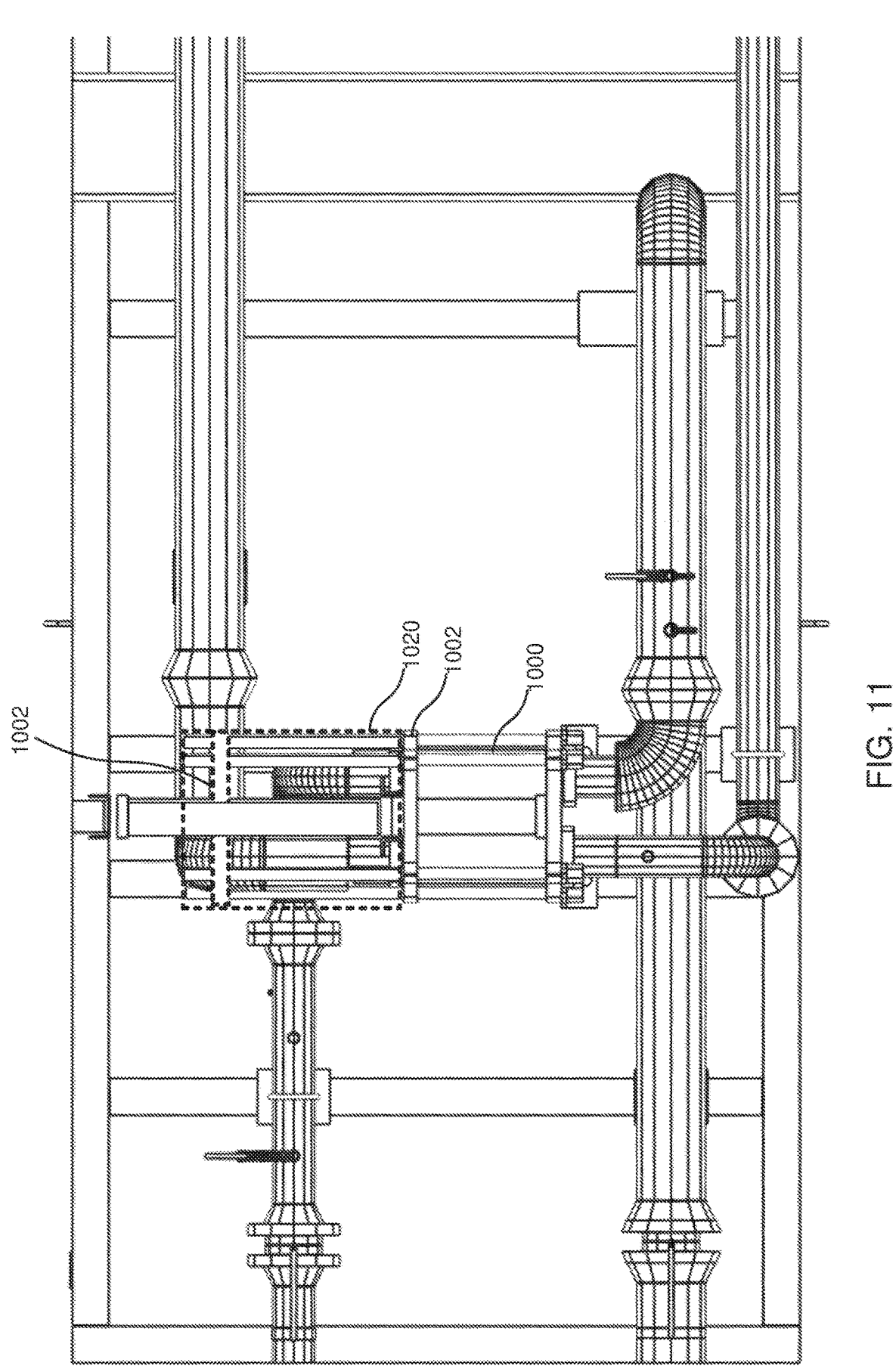
FIG. 11 illustrates an overhead view of an embodiment of the mobile heat exchanger skid with a smaller cleaning volume than that shown in FIG. 10.

FIG. 11 illustrates another overhead view of an embodiment of the mobile heat exchanger skid, but with a smaller cleaning volume than that shown in FIG. 10. In particular, this cleaning volume 1020 has a proximal-to-distal dimension, or length, substantially the same or slightly greater than that of the plates or housing of the heat exchanger 1000. It also has a left-to-right dimension (Side B to Side A), or width, stretching from the cover plate 1002 in the closed position to substantially an end of the guide rods.

Figure 12:
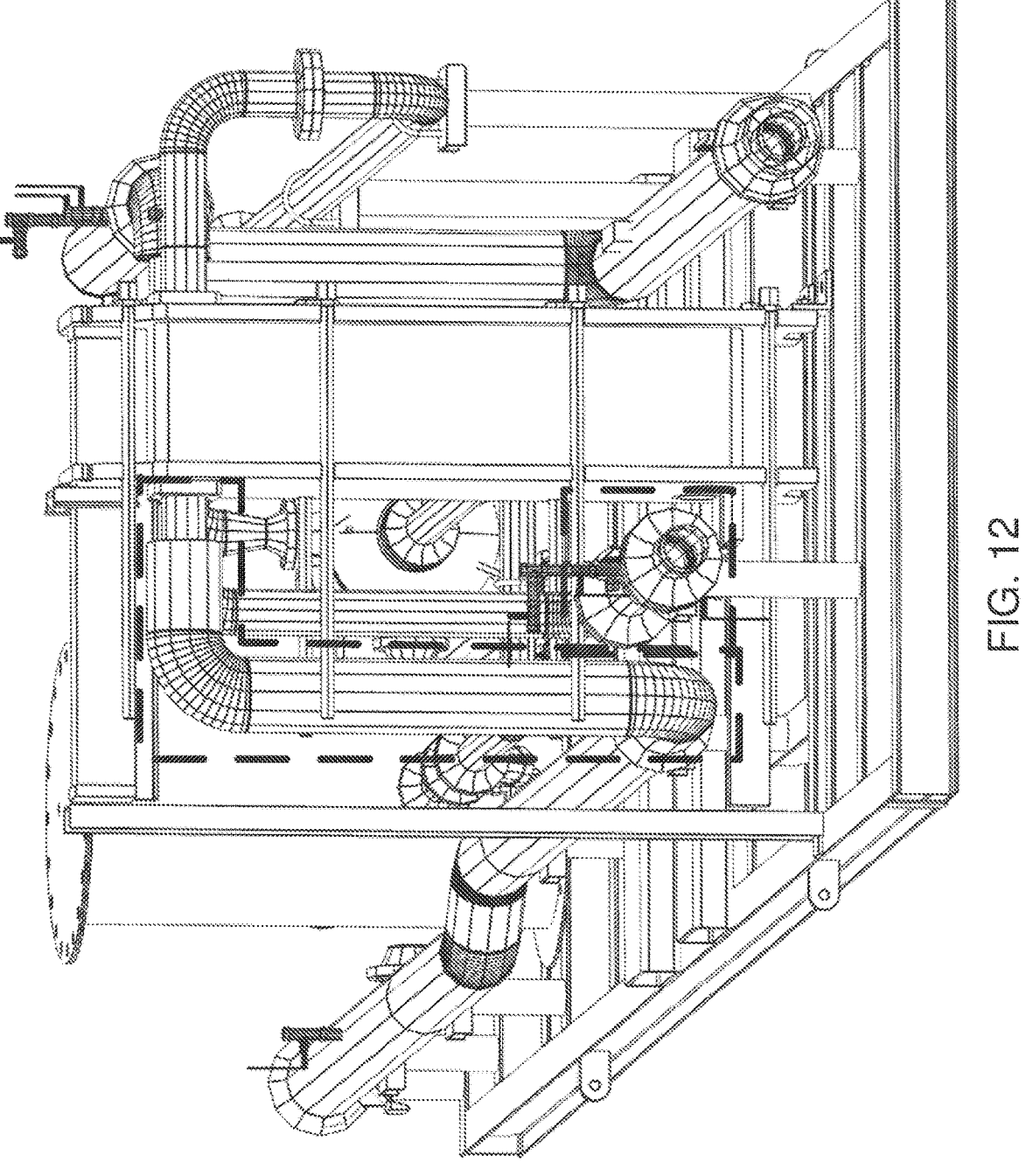
FIG. 12 illustrates a perspective view of an embodiment of the mobile heat exchanger skid with the removable pipe sections within the cleaning volume outlined in dashed lines.

FIG. 12 illustrates a perspective view of an embodiment of the mobile heat exchanger skid with the removable pipe sections outlined in dashed lines. Although not shown, these removable pipe sections may be the only structures within the cleaning volume.

Figure 13:
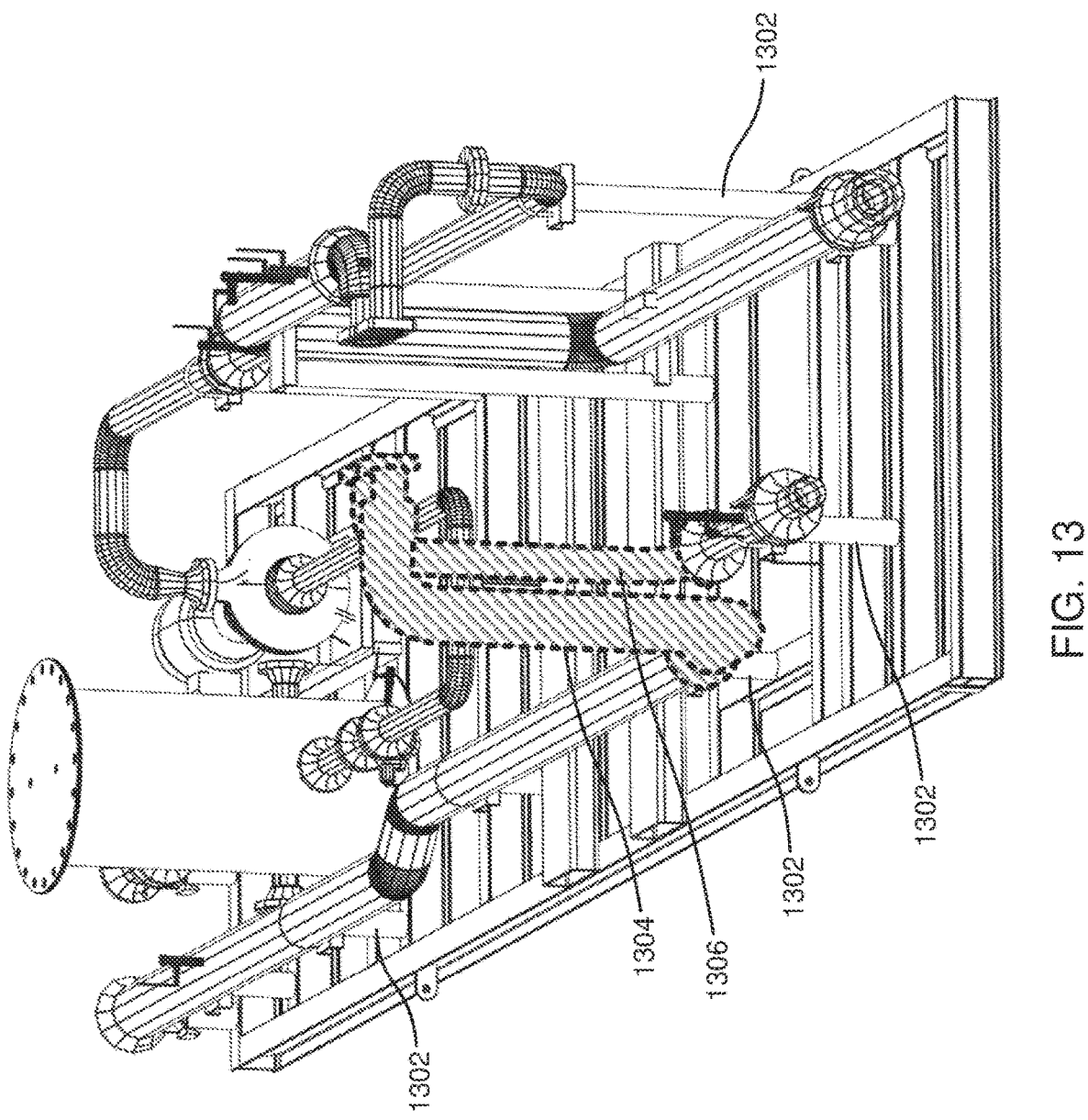
FIG. 13 shows an embodiment of the mobile heat exchanger skid with the heat exchanger removed or hidden to allow better visibility of the pipe segments, including two removable pipe sections-one from each of the first and second pipe loops.

FIG. 13 shows an embodiment of the mobile heat exchanger skid with the heat exchanger removed or hidden to allow better visibility of the pipe segments, including two removable pipe sections (1304 and 1306)—one from the first loop and one from the second pipe loop. These removable pipe sections 1304 and 1306 may be similar to second and first removable pipe sections 843 and 841, in FIG. 8, respectively. FIG. 13 also shows a plurality of frame struts 1302 that extend upward from a substantially flat rectangular frame. A frame strut 1302 can include a coupling member at a top thereof to retain a portion of the first or second pipe loops. As seen, none of these frame struts is arranged near the removable pipe sections. In other words, none of the frame struts is arranged in the cleaning volume.

Figures 14A, 14B:
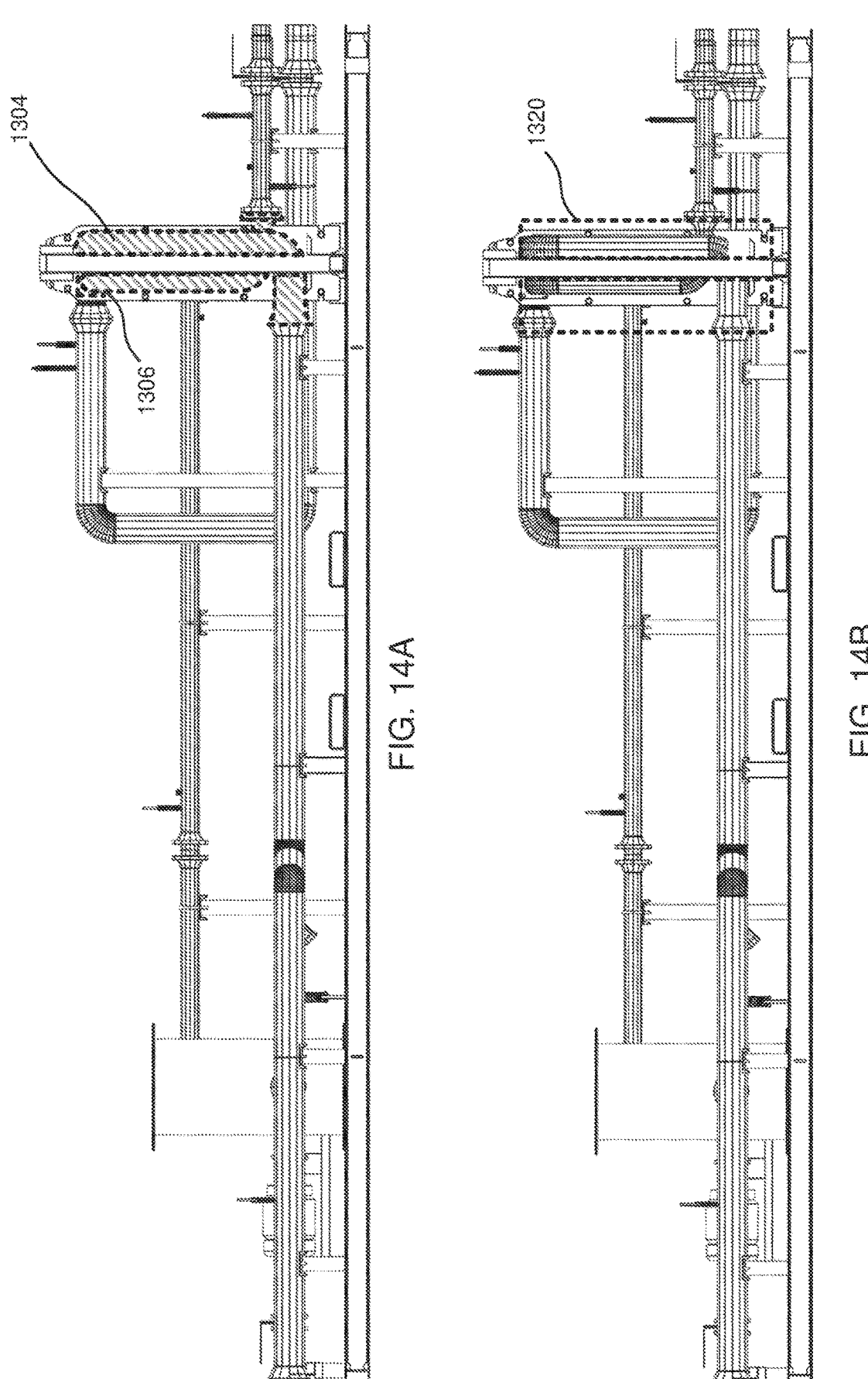
FIG. 14A provides an elevation view from Side A of the mobile heat exchanger skid seen in FIG. 13, highlighting the removable pipe sections.
FIG. 14B provides an elevation view from Side A of the mobile heat exchanger skid in FIG. 14A, highlighting the cleaning volume.

FIG. 14A provides an elevation view from Side A of the mobile heat exchanger skid seen in FIG. 13. One again sees the two removable pipe sections 1304 and 1306 and in FIG. 14B the cleaning volume 1320 can be seen to overlap with the two removable pipe sections and that this volume 1320 is devoid of frame struts or any immovable or hard to move/remove pipe segments.

Figure 9:
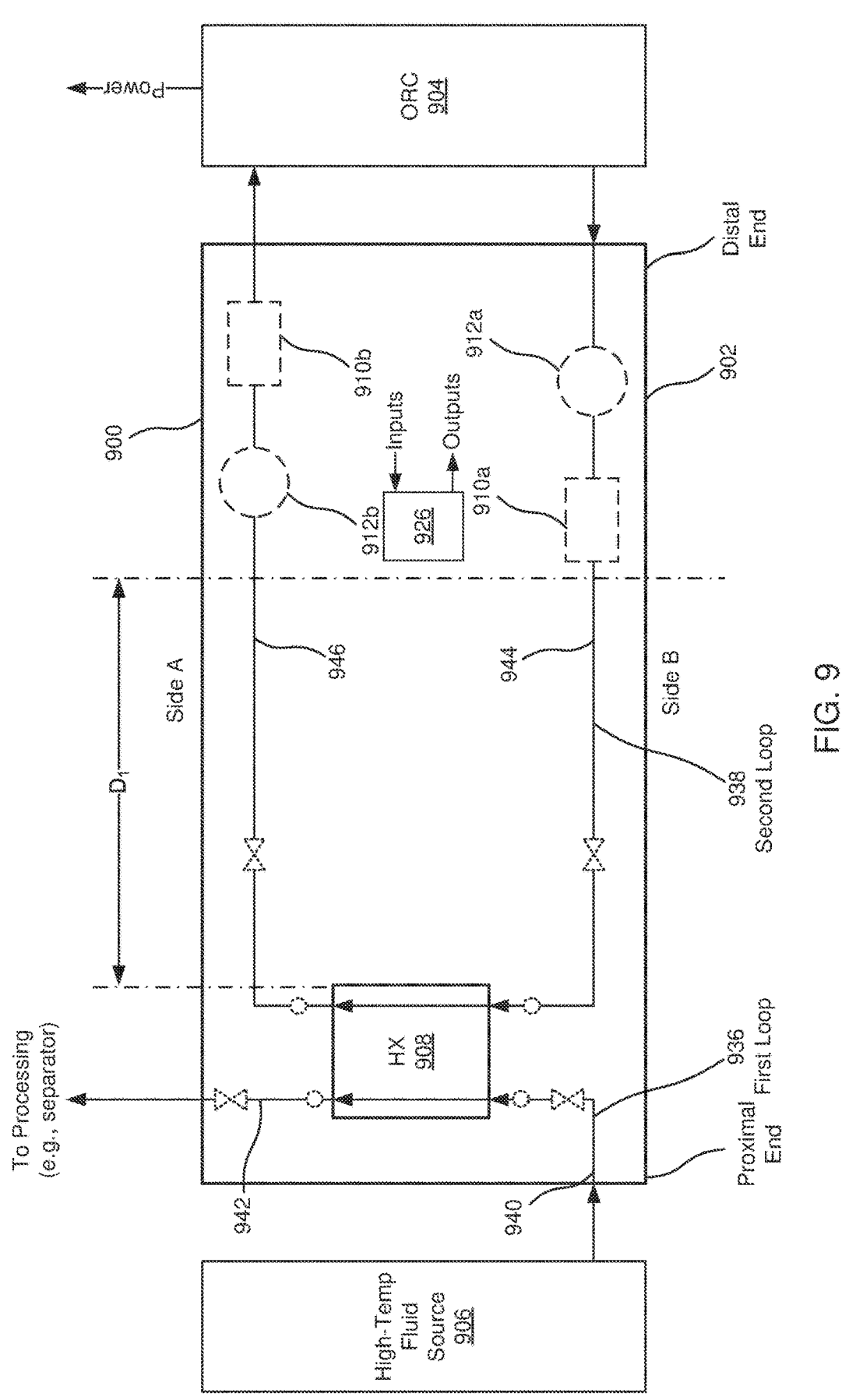
FIG. 9 illustrates an embodiment of the mobile heat exchanger skid where one or more optional sensors and a controller provide a feedback loop.

FIG. 9 illustrates an embodiment of the mobile heat exchanger skid where one or more optional sensors and a controller provide a feedback loop for controlling one or more optional valves and/or a pump to regulate fluid flow in the first and second pipe loops to thereby optimize cooling of a high-temperature fluid and/or to optimize power generation in an ORC assembly. A controller 926 can receive input signals from one or more sensors arranged at inputs and outputs of the heat exchanger 908, and the controller 926 can further provide output signals, such as control signals to one or more valves and/or the pump 910a or 910b. One sensor and one valve are shown on each pipe segment of the first and second pipe loops 936 and 938. Each of the illustrated sensors can represent a temperature sensor, flow sensor, a pressure sensor, or any combination thereof. Generally, a pair of sensors on opposing sides of the heat exchanger 908 are used to monitor fluid property differences on opposing sides of the heat exchanger 908. Any number of these sensors can be used depending on the application and feedback mechanism. For instance, four temperature and four pressure sensors can be used in one application to measure changes in pressure and temperature across the heat exchanger for both pipe loops. This data can be supplied to the controller 926, which determines whether a flow rate in the first and/or second pipe loop 936, 938 should be increased or decreased. In the first pipe loop 936, opening or closing one of the valves wholly or partially can be used to adjust a flow rate of the high-temperature fluid. In the second pipe loop 938, the pump 910a or 910b and/or one of the valves can be adjusted to adjust a flow rate of the working fluid. For instance, increasing a flow rate of the working fluid generally increases a rate of thermal transport to the ORC assembly 904 (and from the high-temperature fluid). Thus, increasing the flow rate of the working fluid either by increasing pump pressure or by opening one of the valves, may be used to increase a cooling rate of the high-temperature fluid (i.e., to optimize for cooling). Typically, a rate of flow in the second pipe loop 938 is 3 to 5 times the rate of flow in the first pipe loop 936. Although not shown, the ORC assembly 904 may include one, two, or more temperature and/or pressure sensors that may further provide data for the controller 926 to use in determining how to adjust flow rates in the first and second pipe loops 936 and 938.

In a particular but non-limiting embodiment, two or more temperature and/or pressure sensors can be arranged on the first and/or second pipe loops. The controller 926 can receive data (e.g., measurements) from the two or more sensors, and can be configured to adjust a flow in at least one of the first pipe loop 936 and the second pipe loop 938 to optimize for at least one of power generation in the ORC assembly 904 and cooling of the high-temperature fluid. Further, the controller 926 may be configured to adjust the pump 910a or 910b in the second pipe loop 938 and/or one of the valves in the second pipe loop 938 to optimize thermal transfer between the first and second pipe loops 936 and 938. In some embodiments, the temperature sensor(s) can be located in a thermal well arranged along one or more of the first and second pipe loops 936 and 938.

The low-pressure heat exchangers described throughout this disclosure can be implemented as any number of heat exchanger variants, with gasketed plate heat exchangers being just one non-limiting example. For instance, the TL10 Gasketed Plate Heat Exchanger from ALFA LAVAL LUND AB of Sweden is one non-limiting example of a low-pressure heat exchanger that may be implemented as heat exchanger 808, 908, 1000 or 1700.

Due to the Class I, Division 2, hazardous location classification, certain components of the skid may need to be manufactured to a higher specification (e.g., Explosion-Proof Equipment) if sources of sparks and hydrocarbons are within a 15-foot distance of each other. To avoid the costs and hassle of Explosion-Proof Equipment, the skid is designed with at least a 15-foot distance, $D_1$, between the (1) first pipe loop 936 and the heat exchanger 908 and (2) electronics such as the controller 926, pump 910a or 910b, and ORC assembly 904. In other words, the heat exchanger 908 can be located at the proximal end of the skid 900 and the pump 910a or 910b, the controller 926, and the ORC assembly 904 can be arranged at or near the distal end of the skid 900. In some embodiments, a frame of around 23 feet may be preferred to maintain the distance, $D_1$, of at least 15 feet between portions of the first pipe loop 936 and the primary electronics. As seen in later figures, the arrangement of pipe locations, paths, and elbows, is also designed to enforce this 15 foot gap, $D_1$, between the (1) heat exchanger 908 and first pipe loop 936 and (2) electronics. One will appreciate that since the distance, $D_1$, may not span the length of the skid 900, the heat exchanger 908 and/or primary electronics, such as those of the controller 926 and the pump 910a or 910b, need not be arranged at opposing edges of the skid 900, and instead can be arranged near the proximal and distal ends (or end regions that leave a distance or gap $D_1$ therebetween). In some embodiments, the distance, $D_1$, is maintained between any portion of the first pipe loop 936 and primary electronics. For instance, in FIG. 10, where an elbow of the first pipe loop extends toward the distal end of the skid (to the right in FIG. 10), the distance between the heat exchanger 1000 and primary electronics at the distal end of the skid, may be greater than $D_1$ since the start of the distance, $D_1$, would be measured from the right-most elbow in the first pipe loop seen in FIG. 10. Although the 15-foot gap is designed into certain embodiments, it is not required, and in some cases a more compact design may be worth the added expense of Explosion-Proof electronics.

In some embodiments, a minimum temperature of the working fluid reaching the ORC assembly for power optimization is 150° F. and a maximum is 350° F. This maximum temperature allows low-cost polyethylene piping to be used. Where the skid is primarily used for cooling the high-temperature fluid, temperatures lower than 150° F. reaching the ORC assembly may be acceptable. For instance, in applications focused on cooling the high-temperature fluid, the working fluid may reach the ORC assembly at between 30° and 350° F.

Although not illustrated, in some embodiments, a back-flow system can be used to reverse a flow direction of the first pipe loop to help clean the heat exchanger without even removing a cover panel. In yet other embodiments, a second heat exchanger can be added and a switched valve placed between them, such that the high-temperature fluid in the first pipe loop is passing through at least one of the two heat exchangers at any time. The second pipe loop could pass serially through both heat exchangers or could also include a switched connection such that the second pipe loop is only in fluid communication with the one of the heat exchangers that is also in fluid communication with the high-temperature fluid source 906 at any given time. In this way, one of the heat exchangers can be pulled offline for cleaning without disrupting hydrocarbon production.

Figure 15:
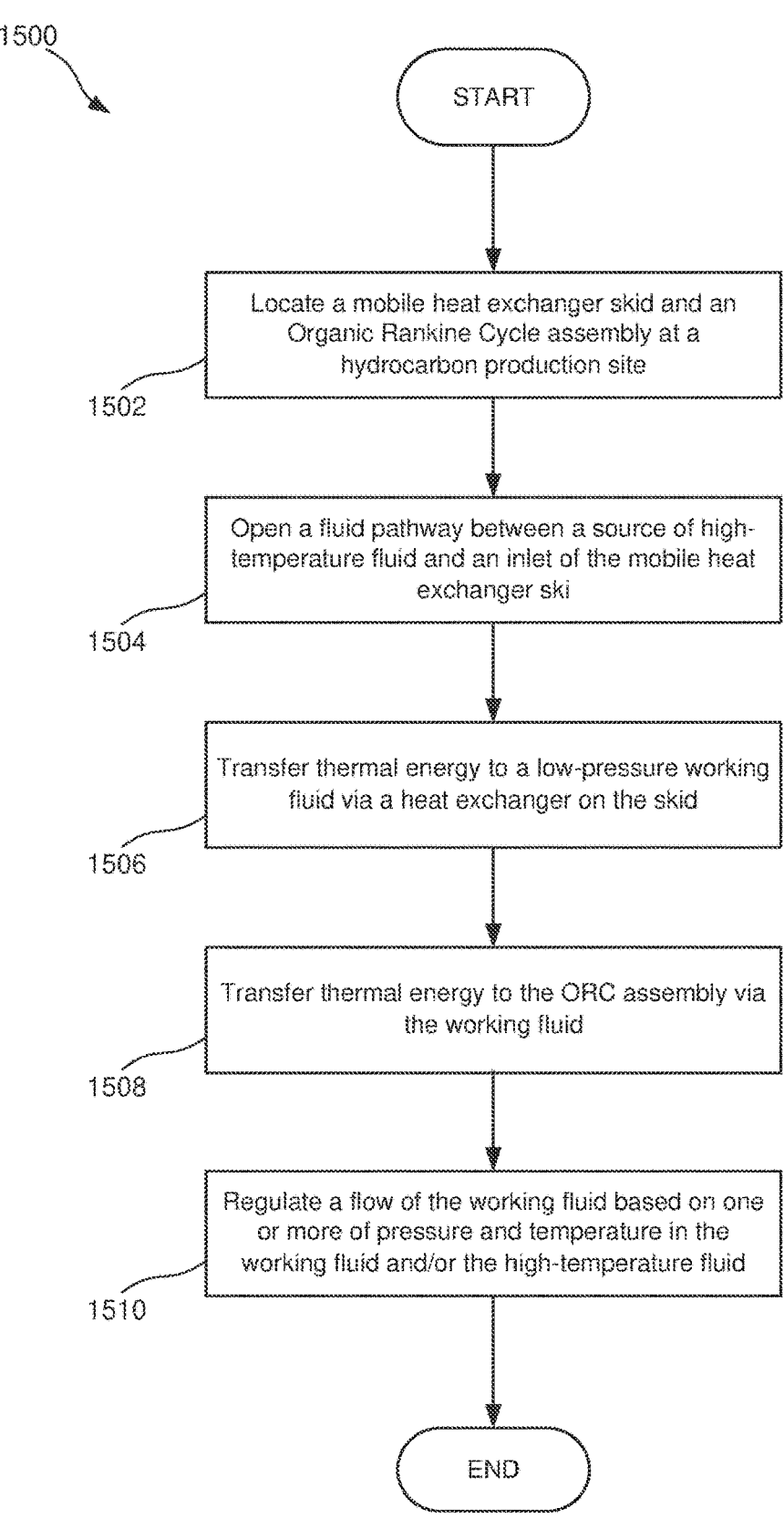
FIG. 15 is a flowchart of an example method for operating a mobile heat exchanger skid such as the ones described throughout this disclosure.

FIG. 15 is a flowchart of an example method for operating a mobile heat exchanger skid such as the ones described throughout this disclosure. At step 1502, the method 1500 includes locating a mobile heat exchanger skid and an ORC assembly at a hydrocarbon production site. At step 1504, the method 1500 includes opening a fluid pathway between a source of high-temperature fluid and an inlet of the mobile heat exchanger skid (e.g., opening the optional valve on first pipe segment 940 in FIG. 9). At step 1506, the method 1500 includes transferring thermal energy to a low-pressure working fluid via a low-pressure heat exchanger of the skid and at step 1508 transferring at least some of this thermal energy to the ORC assembly via the working fluid. At step 1510, the method 1500 includes regulating a flow of the working fluid based at least one of pressure and temperature in at least one of the working fluid and the high-temperature fluid. In some embodiments, a controller may be used to implement the method 1500. In some embodiments, the controller can further take into account an atmospheric temperature in a vicinity of the mobile heat exchanger skid.

Figure 16:
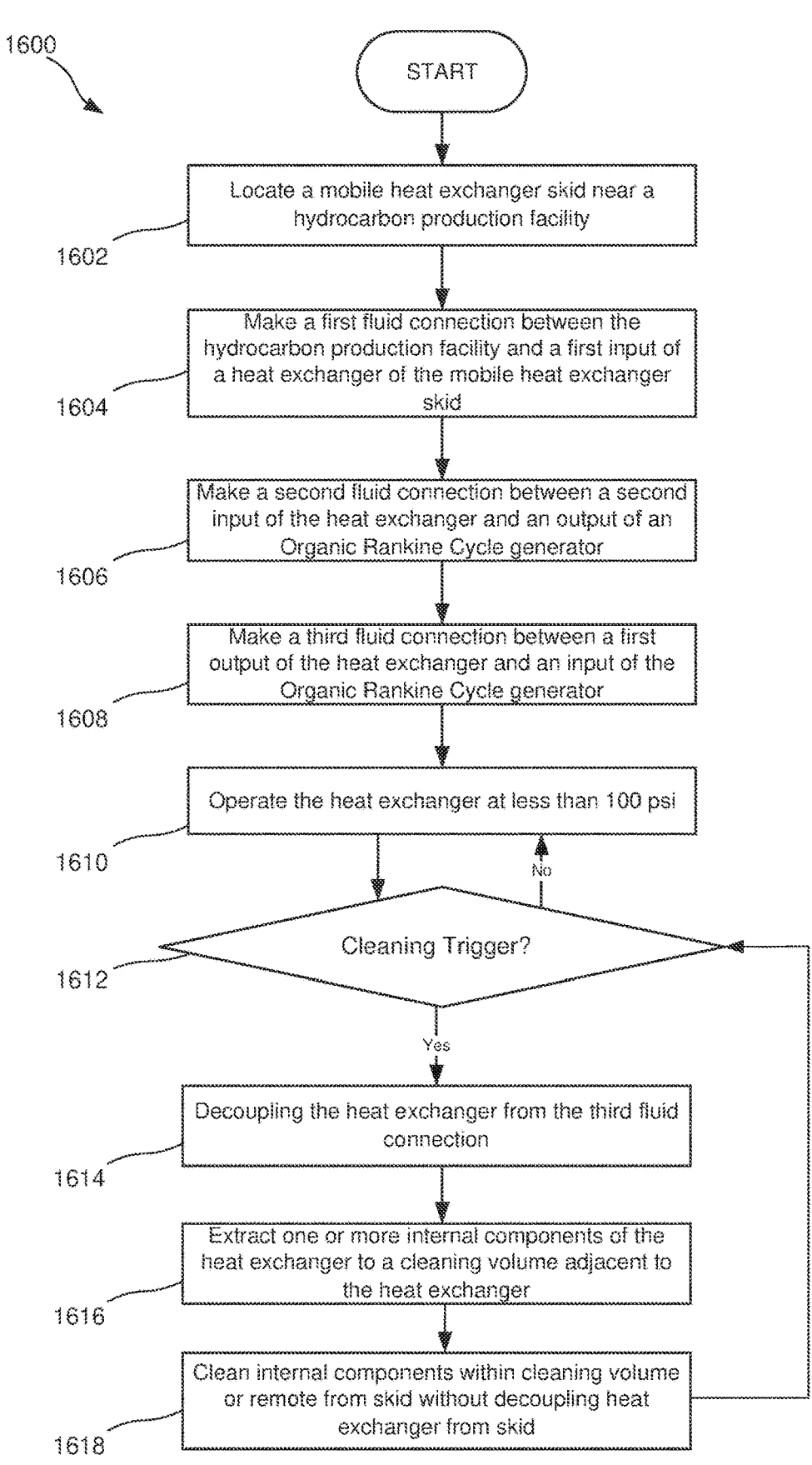
FIG. 16 is a flowchart of an example method for operating a mobile heat exchanger skid such as the ones described throughout this disclosure.

FIG. 16 is a flowchart of an example method for operating a mobile heat exchanger skid such as the ones described throughout this disclosure. At step 1602, the method 1600 includes locating the mobile heat exchanger skid near a hydrocarbon production facility. At step 1604, the method 1600 includes making a first fluid connection between the hydrocarbon production facility and a first input of a heat exchanger of the mobile heat exchanger skid. At step 1606, the method 1600 includes making a second fluid connection between a second input of the heat exchanger and an output of an Organic Rankine Cycle generator. At step 1608, the method includes making a third fluid connection between a first output of the heat exchanger and an input of the Organic Rankine Cycle generator. At step 1610, the method includes operating the heat exchanger at less than 600 psi on the first pipe loop side (i.e., the high-temperature fluid) and at less than 150 psi on the second pipe loop side (i.e., the working fluid) until a cleaning trigger occurs (Decision 1612). In other words, the heat exchanger and both pipe loops are operated at "low pressure" as compared to high pressure systems using 1000 psi or higher fluids. A cleaning trigger can include a certain drop in pressure, flow, heat recovery, or a combination of these. For instance, a drop in pressure, flow, or heat recovery by at least 15% or at least 20% may constitute a cleaning trigger. This threshold may trigger a light cleaning such as aqueous scrubbing of heat exchanger plates while the plates are in the cleaning volume. In other words, once the cleaning trigger=yes, the step 1614 includes decoupling the heat exchanger from the third fluid connection (e.g., removing first removable pipe section 841), and at step 1616, extracting one or more internal components of the heat exchanger to a cleaning volume adjacent to the low-pressure heat exchanger and at step 1618, cleaning the one or more internal components within the cleaning volume or remote from the mobile heat exchanger skid without decoupling the heat exchanger from the mobile heat exchanger skid. The method 1600 continues until another cleaning trigger occurs or until the mobile heat exchanger skid is moved to a different hydrocarbon production facility.

Although not shown, the method 1600 can also include making a fourth fluid connection between a second output of the heat exchanger and a downstream process or storage facility. This fourth fluid connection can also be decoupled when cleaning is needed. Examples of the third and fourth fluid connections include removable pipe segments 841 and 843 in FIG. 8.

The mobile heat exchanger skid can also be decoupled from the first, second, and third fluid connections for the purpose of moving the skid. For instance, the skid can be decoupled and then moved to a second hydrocarbon production facility where a new set of first, second, and third fluid connections can be made with the second hydrocarbon production facility and a second Organic Rankine Cycle generator.

FIGS. 1-5 illustrate a heat exchanger skid 100 according to one embodiment of the present disclosure.

FIG. 1 illustrates a perspective view of an embodiment of the present disclosure, depicting a modular heat exchanger skid 100. Specifically, FIG. 1 depicts a rectangular, cuboid metallic frame 101 to which a first pipe loop 102, a second pipe loop 103, a heat exchanger 104, a working fluid containment tank 105, and a pump 106 are affixed. The working fluid containment tank 105, the pump 106, and second pipe loop 103 may be filled with water or a water and glycol mix but are not limited to those fluids, referred to as the first fluid. In some embodiments, any aqueous first fluid can be used. The heat exchanger 104 may be a plate-and-frame style heat exchanger, for instance, as depicted in FIG. 17, or in alternative embodiments it might take the form of a shell-and-tube style heat exchanger but is not limited to these configurations. Plate-and-frame heat exchangers tend to be used where thermal efficiency is a priority (e.g., where lower oil stream temperatures are seen), but also involve higher pressure and lower flow rates, and thus shell-and-tube are often used where higher temperatures and higher flow rates/pressures are encountered. The rectangular, cuboid metallic frame 101 comprises at least one support beam 109 affixed perpendicularly to at least two horizontal frame beams 110a, 110b, 1110c. The first pipe loop 102 and the second pipe loop 103 are present at varying elevations above the rectangular, cuboid metallic frame 101 and are affixed to the rectangular, cuboid metallic frame 101 by at least one vertical beam such as 111. The at least one frame strut 111 being capped by a small perpendicular steel member 112 and affixed to the first pipe loop 102 or the second pipe loop 103 with a metallic U-shaped bolt 113 or other connector. Various instances of the frame strut 111, small perpendicular steel member 112, and U-shaped bolt can be used to support the pipe loops 102 and 104 at various locations on the sled 100.

Figure 2:
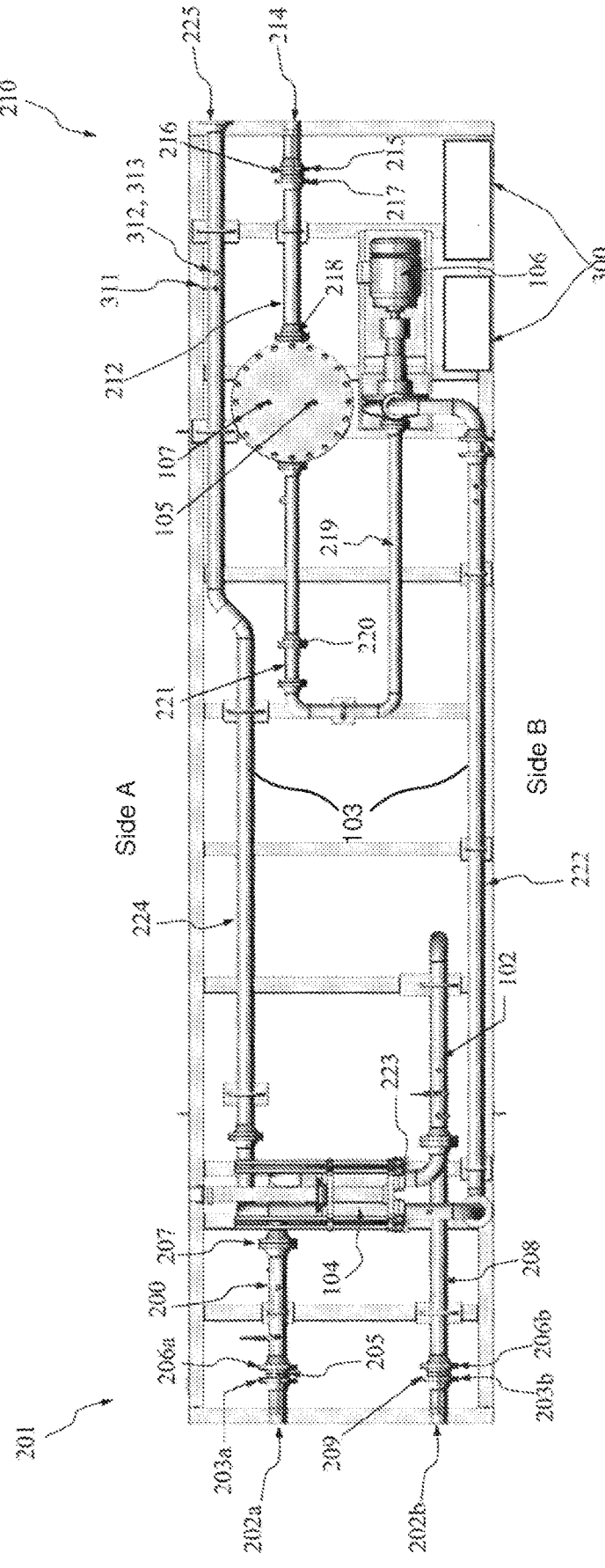
FIG. 2 is a top view of an embodiment of the present disclosure.

FIG. 2 illustrates a top view of an embodiment of the present disclosure, wherein a first pipe segment 200 and plurality of first tubular sub elements 201 of the second pipe loop 103 transport geothermal energy from external piping 108 through a first flange connection 202a, a second flange connections 203a, a first valve 205, a third flange connection 206a, a fourth flange connection 207, and into the heat exchanger 104. The first valve 205 positioned between the second flange connection 203a and the third flange connection 206a. The fourth flange connection 207 can be adjacent to the heat exchanger 104 (i.e., a last connection before the heat exchanger 104). The geothermal energy traverses from the heat exchanger 104, with some of its thermal energy now removed, through a second pipe segment 208, to a fifth flange connection 206b, a second valve 209, a sixth flange connections 202b, a seventh flange connection 202b, and out of the heat exchanger skid 100 to external piping 108 and other downstream processing or storage. The second valve 209 is positioned between the second flange connection 204b and the third flange connection 206b. The first fluid traversing through the first pipe segment 200, the heat exchanger 104, and the second pipe segment 208 does not come into contact with fluids from other pipe segments of the heat exchanger skid 100, such as a working fluid in the second pipe loop 103.

A plurality of second tubular sub elements 210 of the second pipe loop 103 convey thermal energy from the heat exchanger 104 to a geothermal heat engine (e.g., an Organic Rankine Cycle assembly), as described and further detailed, for instance, in FIG. 8. A third pipe segment 212 connects to a heated fluid inlet port 214 configured for coupling to the geothermal heat engine 211 and directs flow of a working fluid through a sixth flange connection 215, a third valve 216, and a seventh flange connection 217. The third valve 216 is positioned between the sixth flange connection 215 and the seventh flange connection 217. After traversing through an eighth flange connection 218, the working fluid can flow into the working fluid containment tank 105. The working fluid containment tank 105 comprises a reservoir 107 ensuring that the second pipe loop 103 remains filled with working fluid during operation of the heat exchanger skid 100, and further provides a volume for an air pocket to collect, thereby minimizing air in the second pipe loop 103. Said another way, the working fluid containment tank 105 maintains backpressure in the second pipe loop 103 to avoid cavitation therein. A fourth pipe segment 219 permits the working fluid to flow from the working fluid containment tank 105 to the pump 106. It should be appreciated that the upstream or downstream orientation of the pump 106 and tank 105 relative to each other are interchangeable and non-limiting. Additionally, while the pump 106 and tank 105 are both arranged in a portion of the second pipe loop 103 between the heat exchanger 104 and the geothermal heat engine 211, in other embodiments, this arrangement is not necessary and one or both of these components can be arranged in the sixth pipe segment 224. The fourth pipe segment 219 comprises one or more flanges 220 and one or more connections 221 such that the working fluid containment tank 105 is connected to the pump 106 with a 180-degree change in direction in the fourth pipe segment 219. A fifth pipe segment 222 connects the pump 106 to an inlet of the heat exchanger 104, wherein the working fluid in the second pipe loop 103 will gain thermal energy by heat exchange with the first pipe loop 102. A sixth pipe segment 224 delivers the geothermal energy to a ninth flange connection 225, configured for coupling to the geothermal heat engine 211 (see FIG. 9).

The geothermal heat engine 211 may be configured to convert thermal energy in the working fluid to electricity at or above 175° F. or 180° F. or 200° F. In other embodiments, this conversion is possible with working fluid in the geothermal heat engine 211 of up to 250° F. or up to 500° F. These temperatures may be compatible with a fluid formed of a liquid or a liquid gas mixture. However, where the working fluid is purely or primarily a gas, temperatures of up to 800° F. can be used. Temperatures in the first fluid may be up to 400° F. within the heat exchanger.

Additionally, FIG. 2 illustrates one or more communication boxes 300. The communication box(es) 300 comprises a plurality of network junction boxes 400 (see FIG. 7), a process logic controller(s) 401, and a wireless router 402 to transmit data from a plurality of sensors 403, as described and further detailed in FIGS. 3 and 7. The process logic controller(s) 401 can be used in a feedback loop with the sensors 403 (e.g., 301, 304, 308, and 311) to adjust a state of the first valve 205 and/or second valve 209 to thereby control a rate of flow in the first pipe loop 102 and/or to adjust a state of the third valve 216 and/or pump 106 to thereby control a rate of flow in the second pipe loop 103. For instance, where the skid 100 is primarily optimized for cooling of fluid in the first pipe loop 102, a rate of fluid flow in the second pipe loop 103 may be greater than when the skid 100 is optimized for power production (since greater flow carries more thermal energy, but also expends more energy in the pump 106 than may be generated in the geothermal heat engine 211).

Figure 3:
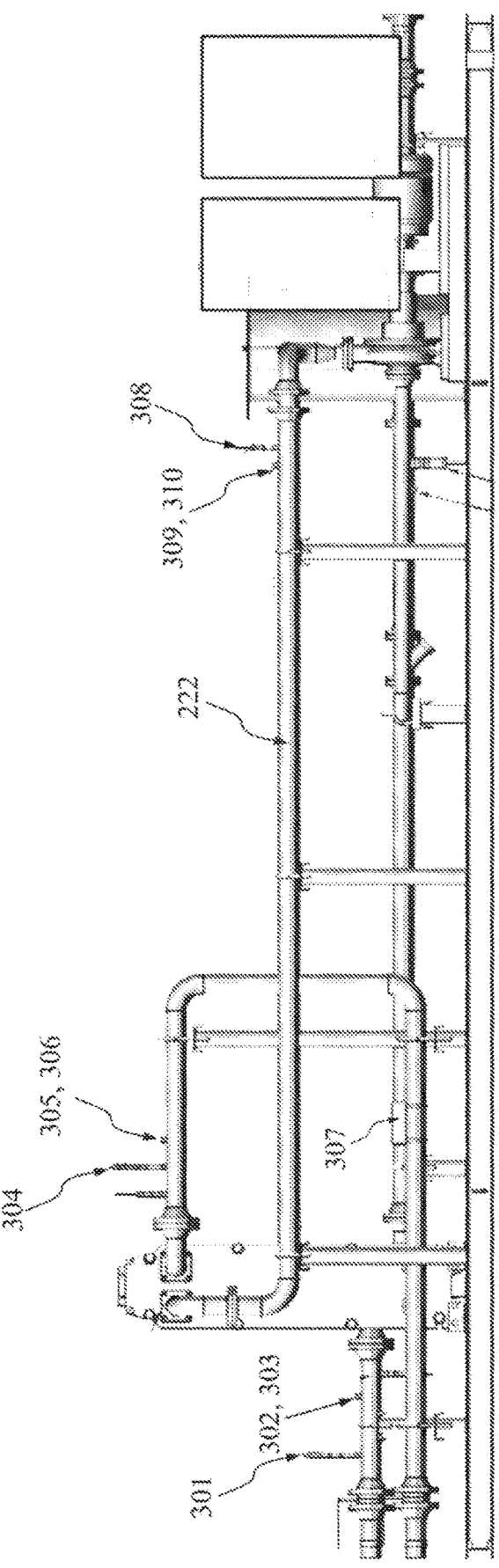
FIG. 3 is a left-side view of an embodiment of the present disclosure.
Figure 7:
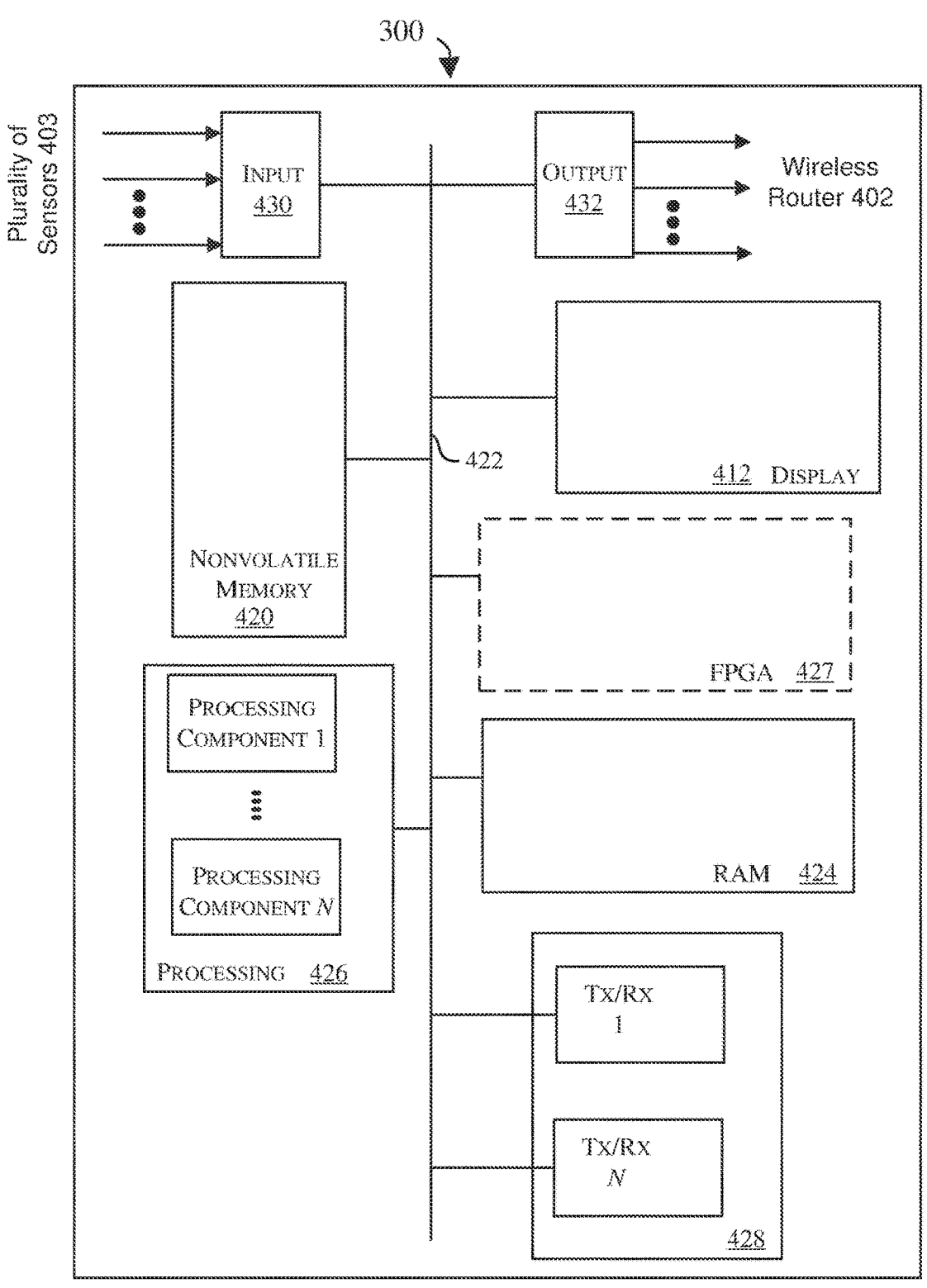
FIG. 7 is a block diagram depicting physical components that may be utilized to realize the data transfer from the plurality of sensors to the communications box and wireless router according to an embodiment of the present disclosure.

FIG. 3 illustrates a left-side view (Side B) of an embodiment of the present disclosure, wherein the plurality of sensors 403 referenced in FIG. 7 are highlighted. A first pressure sensor and transmitter 301 is positioned adjacent a first thermowell 302 on the first pipe segment 200 of the first pipe loop 102, downstream from the heat exchanger 104. A first temperature sensor 303 is housed within the first thermowell 302, and is also downstream from the heat exchanger 104. A second pressure sensor and transmitter 304, a second thermowell 305, a second temperature sensor 306, and a flow meter 307 are positioned relative to the second pipe segment 208 upstream from the heat exchanger

104. A third pressure sensor and transmitter 308, a third thermowell 309, and a third temperature sensor 310 are also positioned in the second pipe loop 103, on the fifth pipe segment 222 between the pump 106 the heat exchanger 104. A fourth pressure sensor and transmitter 311 (seen in FIG. 2), a fourth thermowell 312 (seen in FIG. 2), and a fourth temperature sensor 313 (seen in FIG. 2) are positioned downstream of the heat exchanger 104 on the sixth pipe segment 224.

Figure 4:
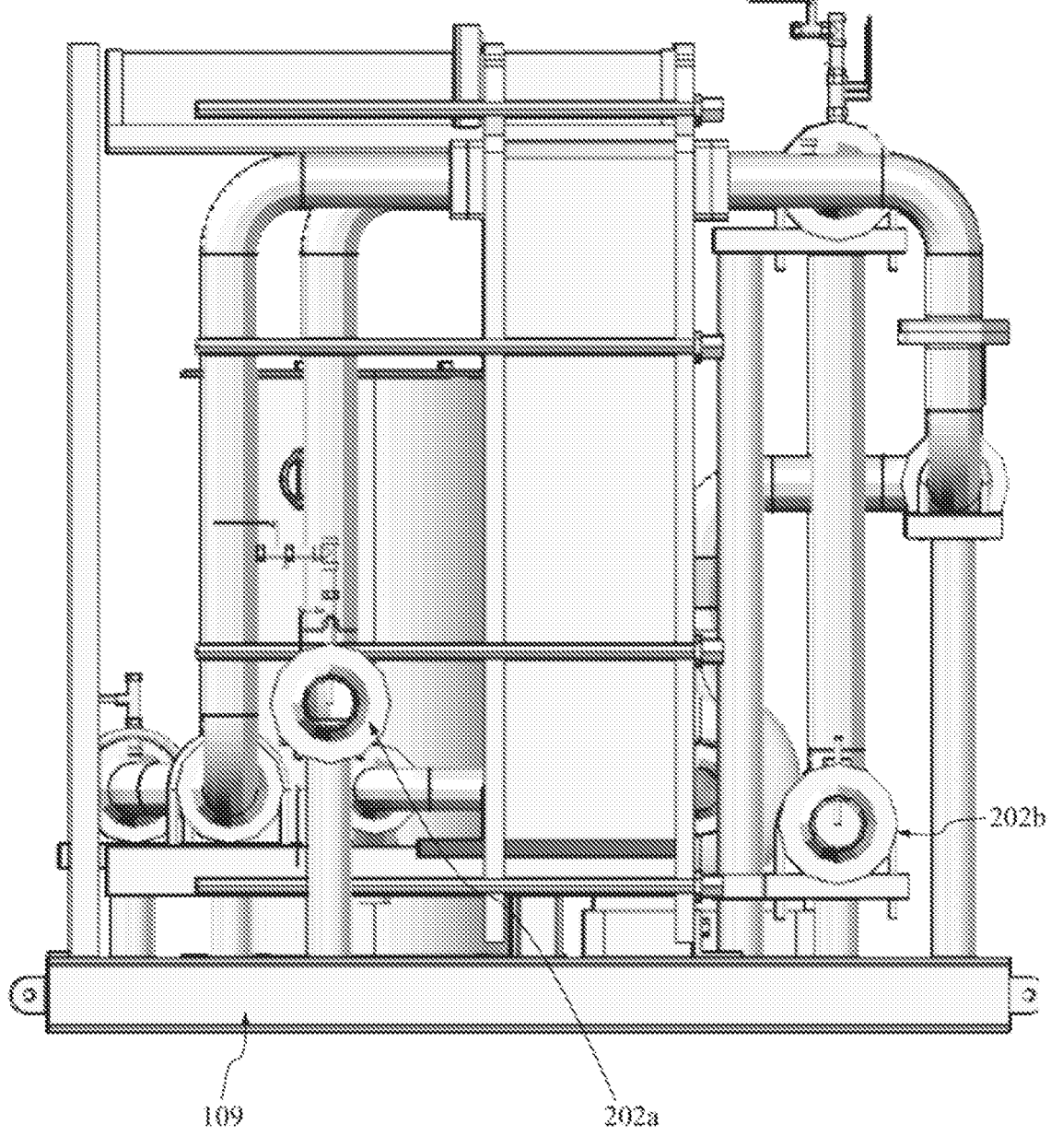
FIG. 4 is a front (proximal) view of an embodiment of the present disclosure.
Figure 5:
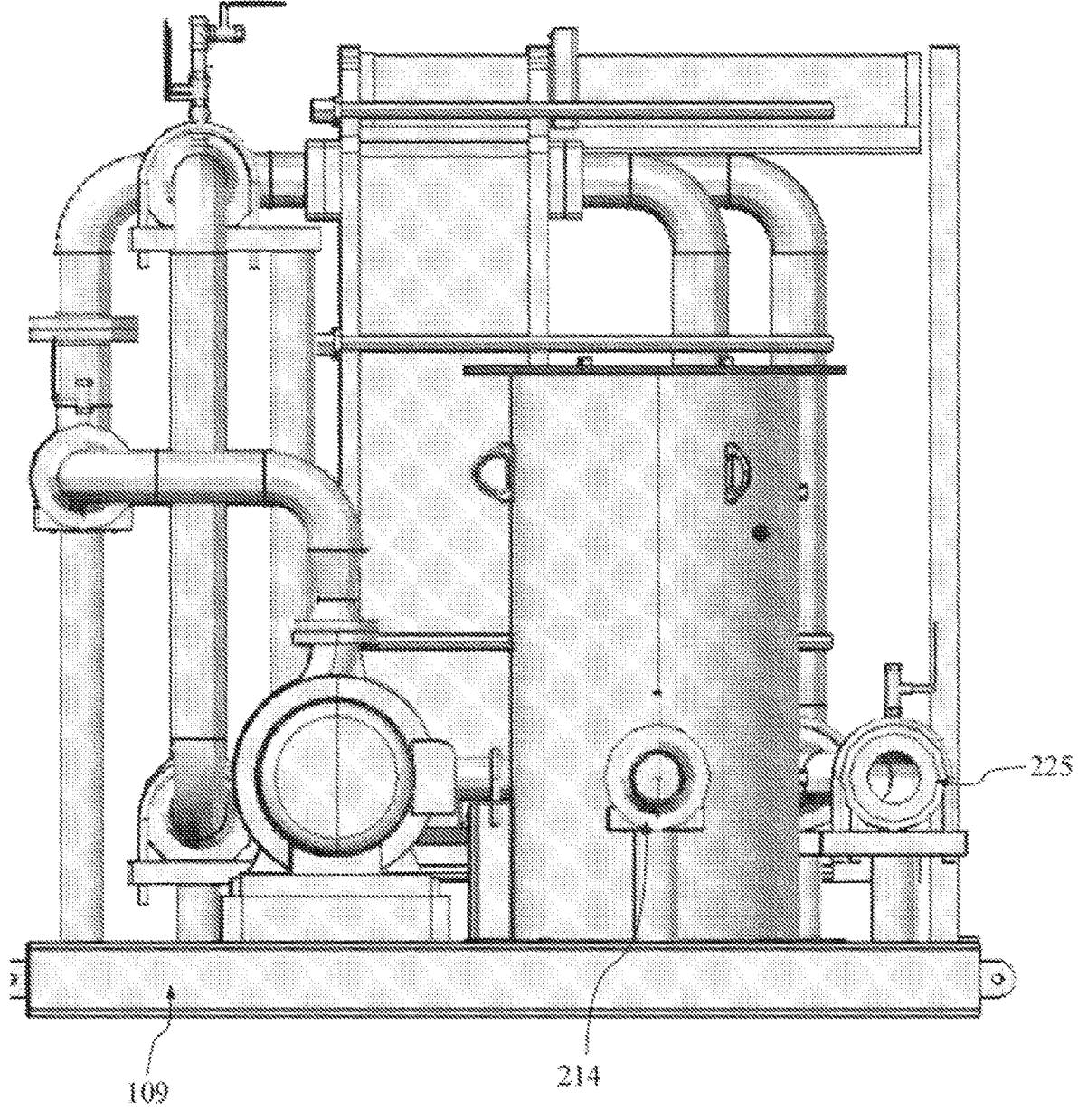
FIG. 5 is a rear (distal) view of an embodiment of the present disclosure.

FIGS. 4 and 5 illustrate front (proximal) and rear (distal) views of an embodiment of the present disclosure and incorporate the detailed description of the figures as described in FIGS. 1-3.

Figure 6:
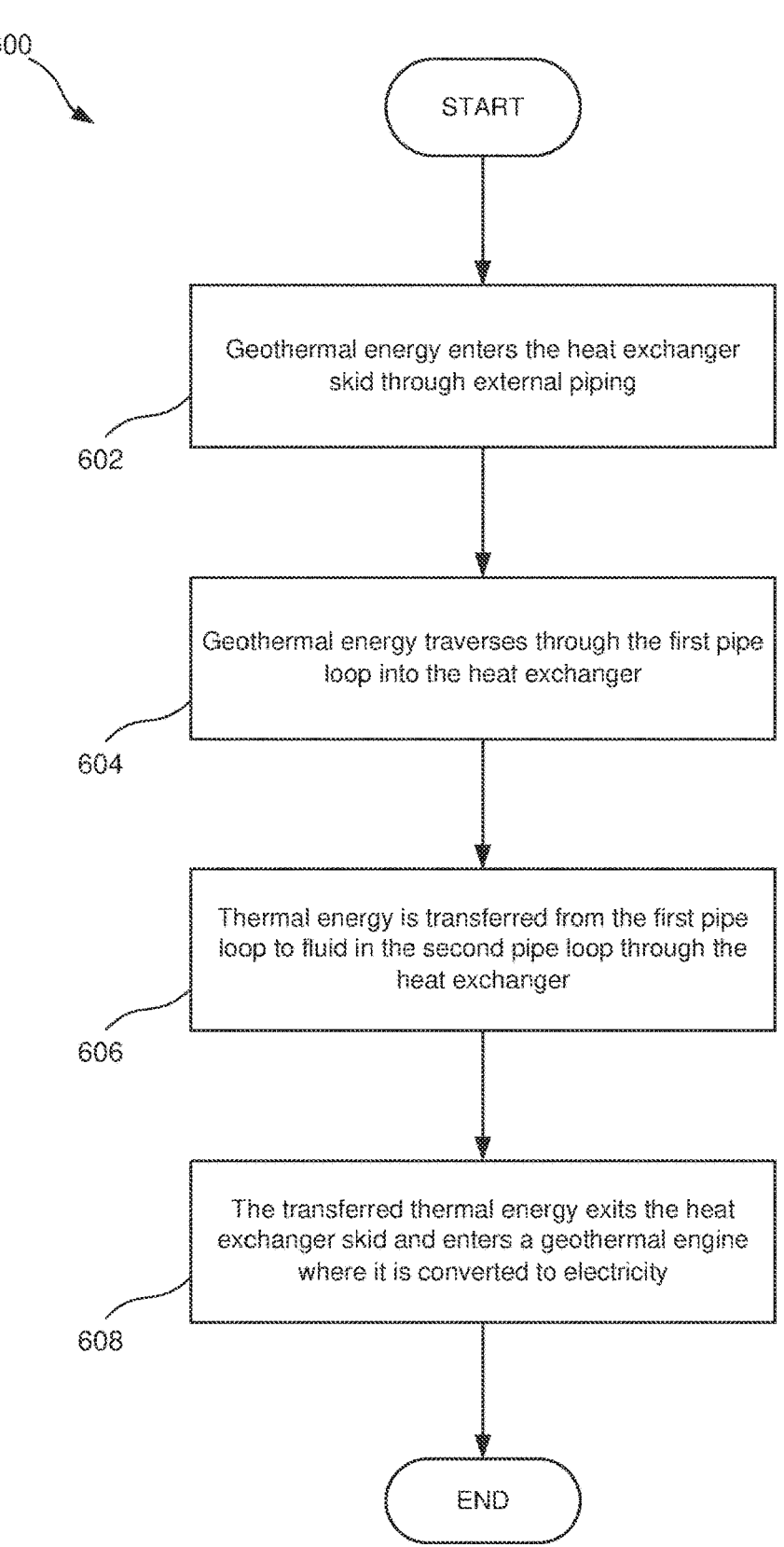
FIG. 6 is a flowchart of geothermal energy conversion through an embodiment of the heat exchanger skid of the present disclosure.

FIG. 6 illustrates a flowchart of geothermal energy conversion through an embodiment of the heat exchanger skid of the present disclosure, wherein geothermal energy enters the first pipe loop (Block 602); geothermal energy traverses through the first pipe loop into the heat exchanger (Block 604); thermal energy is transferred from the first fluid in the first pipe loop to working fluid in the second pipe loop through the heat exchanger (Block 606); and the transferred thermal energy exits the heat exchanger skid and is provided to a geothermal heat engine where the thermal energy in the working fluid is converted to electricity (Block 608).

The methods described in connection with the electrical components of embodiments disclosed herein may be embodied directly in hardware, in processor-executable code encoded in a non-transitory tangible processor readable storage medium, or in a combination of the two. Referring to FIG. 7 for example, shown is a block diagram depicting physical components that may be utilized to realize the data transfer from the plurality of sensors 403 to the communications box 300 and wireless router 402 according to an exemplary embodiment. As shown, in this embodiment an input 401 receives data and transmits it to the user via a display portion 412 and nonvolatile memory 420 are coupled to a bus 422 that is also coupled to random access memory ("RAM") 424, a processing portion 426 (which includes at least one processing component), an optional field programmable gate array (FPGA) 427, and a transceiver component 428. The data is then transmitted via an output 432 from the wireless router 402 out of the communications box 300 for real-time tracking of internal environmental conditions of the first pipe loop 102 and second pipe loop 103. Although the components depicted in FIG. 7 represent physical components, FIG. 7 is not intended to be a detailed hardware diagram; thus many of the components depicted in FIG. 7 may be realized by common constructs or distributed among additional physical components. Moreover, it is contemplated that other existing and yet-to-be developed physical components and architectures may be utilized to implement the functional components described with reference to FIG. 7.

The foregoing is considered as illustrative only on the principles of the disclosure. Further, since numerous modifications and changes will occur to those skilled in the art, it is not desired to limit the disclosure to the exact construction and operation shown and described, and accordingly, all suitable modifications and equivalents may be resorted to, falling within the scope of the disclosure.

What is claimed is:

1. A system for generating power, comprising:
an Organic Rankine Cycle assembly configured to generate the power;
a mobile heat exchanger skid in fluid communication with the Organic Rankine Cycle assembly and configured to transfer thermal energy from a high-temperature fluid to a working fluid, the mobile heat exchanger skid comprising:
a frame having a plurality of extending vertical supports supporting a first pipe loop and a second pipe loop, wherein the first pipe loop comprises a first pipe segment and the second pipe loop comprises a second pipe segment;
a low-pressure heat exchanger mounted on the frame;
a cleaning volume arranged adjacent to the low-pressure heat exchanger;
the first pipe loop and the second pipe loop both selectively coupled to the low-pressure heat exchanger;
a pump in the second pipe loop;
the first pipe loop passes through the low-pressure heat exchanger and is configured to pass the high-temperature fluid through the low-pressure heat exchanger; and
the second pipe loop passes through the low-pressure heat exchanger in proximity to the first pipe loop and is configured to (1) bring the working fluid into the low-pressure heat exchanger at a first temperature, (2) remove the working fluid from the low-pressure heat exchanger at a second temperature greater than the first temperature, and (3) provide the working fluid to the Organic Rankine Cycle assembly;
wherein the cleaning volume is free of extending vertical supports; and
wherein the first pipe segment and the second pipe segment are removably coupled to the low pressure heat exchanger in the cleaning volume to facilitate in situ cleaning of the low-pressure heat exchanger.

2. The system of claim 1, wherein the working fluid is an aqueous solution comprising water.

3. The system of claim 2, wherein the working fluid is an aqueous solution comprising water and glycol.

4. The system of claim 1, wherein the working fluid is primarily in a liquid form throughout the second pipe loop.

5. The system of claim 4, wherein the second pipe loop is maintained below 150 psi.

6. The system of claim 1, wherein the high-temperature fluid is up to a degradation threshold of a polymer or gasket material used to fabricate at least one section of the first pipe loop or a component of the low-pressure heat exchanger.

7. The system of claim 1, wherein the frame is a substantially flat and rectangular skid.

8. The system of claim 7, wherein the cleaning volume at least coincides with a height of plates within the low-pressure heat exchanger.

9. The system of claim 8, wherein the cleaning volume has dimensions at least as great as one or more heat exchanger plates of the low-pressure heat exchanger.

10. The system of claim 9, wherein the cleaning volume extends substantially to coupling interfaces of the first pipe loop and the second pipe loop.

11. The system of claim 1, wherein the high-temperature fluid enters the low-pressure heat exchanger at between 100° F. to 350° F.

12. A mobile heat exchanger assembly comprising:
a frame having a low-pressure heat exchanger coupled to and extending from a top of the frame;
a first pipe loop configured to provide a high-temperature oilfield stream to the low-pressure heat exchanger, the first pipe loop comprising:
a first pipe segment coupled to the low-pressure heat exchanger;
a second pipe segment coupled to the low-pressure heat exchanger;

a passage in the low-pressure heat exchanger coupling the first and second pipe segments; and a second pipe loop configured to provide a low-pressure working fluid to the low-pressure heat exchanger to transfer thermal energy from the high-temperature oilfield stream to the low-pressure working fluid and further configured to provide the low-pressure working fluid to an Organic Rankine Cycle assembly for generating power, the second pipe loop comprising:

a pump;

a third pipe segment coupled to the low-pressure heat exchanger;

a fourth pipe segment coupled to the low-pressure heat exchanger; and a second passage in the low-pressure heat exchanger coupling the third and fourth pipe segments;

wherein the first pipe segment comprises a first removable pipe section and the third pipe segment comprises a second removable pipe section, wherein when the first and second removable pipe sections are removed, a cleaning volume is left adjacent to the low-pressure heat exchanger to facilitate in situ cleaning of the low-pressure heat exchanger.

13. The mobile heat exchanger assembly of claim 12, wherein the first and second removable pipe sections are arranged on a same side of the low-pressure heat exchanger.

14. The mobile heat exchanger assembly of claim 12, wherein the low-pressure working fluid is an aqueous solution comprising water and wherein the low-pressure working fluid is maintained below 150 psi.

15. The mobile heat exchanger assembly of claim 14, wherein the low-pressure working fluid is between 30° F. and 350° F.

16. The mobile heat exchanger assembly of claim 12, wherein the low-pressure working fluid is an aqueous solution comprising water and glycol and wherein the low-pressure working fluid is maintained below 150 psi.

17. The mobile heat exchanger assembly of claim 12, further comprising:

two or more temperature and/or pressure sensors on the first and/or second pipe loops; and a controller receiving data from the two or more sensors and configured to adjust a flow in at least one of the first and second pipe loop to optimize for at least one of power generation and cooling of the high-temperature oilfield stream.

18. The mobile heat exchanger assembly of claim 17, wherein the controller is configured to adjust at least one of the pump and a valve in the second pipe loop to optimize thermal transfer between the first and second pipe loops.

19. The mobile heat exchanger assembly of claim 18, further comprising at least a distance $D_1$ between any portion of the first pipe loop and the controller, where the distance $D_1$ is 15 feet.

* * * * *